(12) United States Patent
Kasai et al.

(10) Patent No.: US 11,460,754 B2
(45) Date of Patent: Oct. 4, 2022

(54) TRANSPORT EQUIPMENT AND SENSOR BRACKET

(71) Applicant: HONDA MOTOR CO., LTD., Tokyo (JP)

(72) Inventors: Keita Kasai, Wako (JP); Takahiro Ohmoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 16/664,972

(22) Filed: Oct. 28, 2019

(65) Prior Publication Data

US 2020/0192189 A1 Jun. 18, 2020

(30) Foreign Application Priority Data

Dec. 18, 2018 (JP) .............................. JP2018-236624

(51) Int. Cl.
  *G03B 11/04* (2021.01)
  *B60R 11/04* (2006.01)

(52) U.S. Cl.
  CPC ............ *G03B 11/045* (2013.01); *B60R 11/04* (2013.01)

(58) Field of Classification Search
  CPC ....... G03B 11/04; G03B 11/045; B60R 11/04; B60R 2011/0003; B60R 2011/0026
  See application file for complete search history.

(56) References Cited

U.S. PATENT DOCUMENTS

| 8,944,705 | B1 | 2/2015 | Matori |
| 10,336,264 | B2 | 7/2019 | Okuda |

| 2005/0001901 | A1 | 1/2005 | Eggers et al. |
| 2007/0041725 | A1 | 2/2007 | Neumann et al. |
| 2015/0015713 | A1 | 1/2015 | Wang et al. |
| 2015/0251605 | A1 | 9/2015 | Uken et al. |
| 2016/0023620 | A1* | 1/2016 | Matori ................... B60R 11/04 348/148 |
| 2017/0240120 | A1 | 8/2017 | Krug et al. |

(Continued)

FOREIGN PATENT DOCUMENTS

| DE | 102014224860 | 6/2016 |
| JP | 2002-341432 | 11/2002 |
| JP | 2015-509458 | 3/2015 |

(Continued)

OTHER PUBLICATIONS

Japanese Office Action for Japanese Patent Application No. 2018-236624 dated Nov. 2, 2021.

(Continued)

*Primary Examiner* — Christopher E Mahoney

(74) *Attorney, Agent, or Firm* — Amin, Turocy & Watson, LLP

(57) ABSTRACT

A vehicle and a camera bracket include a lens hood which surrounds a detection space of an external environment detection camera, the lens hood includes a bottom surface forming part which forms a flat-shaped surface (a bottom surface) facing the detection space, the bottom surface extends to spread radially in the detection direction from the lens side and includes a reflected wave reducing structure on this bottom surface, and the bottom surface forming part includes a partition part that partitions the reflected wave reducing structure into a plurality of regions.

7 Claims, 14 Drawing Sheets

(56) References Cited

U.S. PATENT DOCUMENTS

2018/0288291 A1* 10/2018 Shimizu ................ G02B 13/04
2019/0064636 A1    2/2019 Kang et al.

FOREIGN PATENT DOCUMENTS

| JP | 2017-171165 | 9/2017 |
| JP | 2017-171167 | 9/2017 |
| JP | 2018-522285 | 8/2018 |
| WO | 2014/141357 | 9/2014 |

OTHER PUBLICATIONS

Non-Final Office Action for U.S. Appl. No. 16/665,038 dated May 27, 2021.
Japanese Notice of Allowance for Japanese Patent Application No. 2018-236623 dated Jun. 16, 2020.
Non-Final Office Action for U.S. Appl. No. 16/706,936 dated Aug. 5, 2020.
Final Office Action for U.S. Appl. No. 16/706,936 dated Mar. 25, 2021.

* cited by examiner

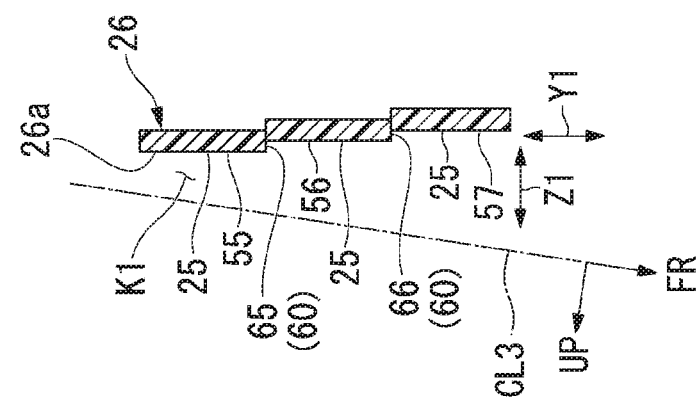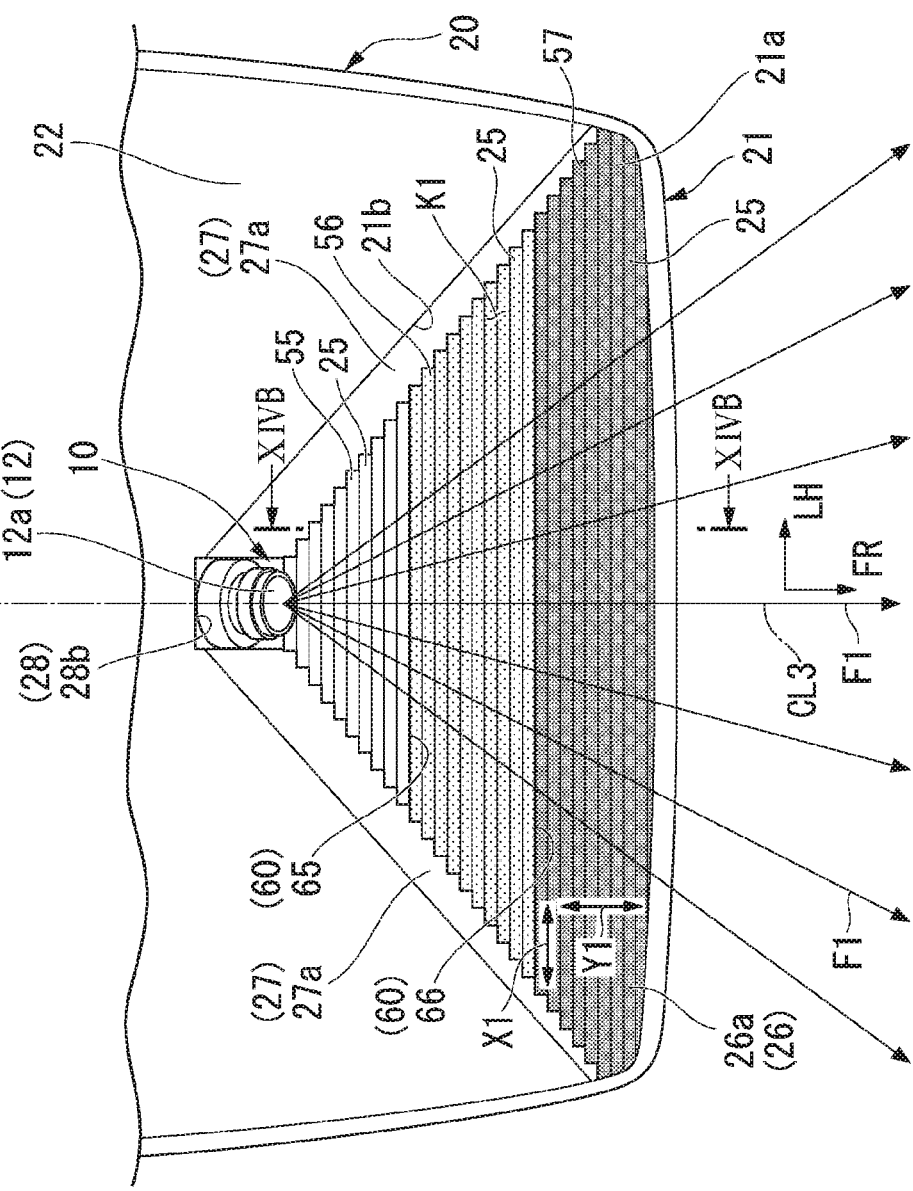

TRANSPORT EQUIPMENT AND SENSOR BRACKET

CROSS-REFERENCE TO RELATED APPLICATION

Priority is claimed on Japanese Patent Application No. 2018-236624, filed Dec. 18, 2018, the content of which is incorporated herein by reference.

BACKGROUND OF THE INVENTION

Field of the Invention

The present invention relates to transport equipment and a sensor bracket.

Description of Related Art

Conventionally, there is transport equipment including a camera as an external environment detection sensor and a bracket which supports the camera on a transport equipment main body (see, for example, German Unexamined Patent Application, First Publication No. 102014224860). The bracket forms a lens hood of the camera. In the lens hood, a stray light shield (Stray Light Shield) is provided as a reflected wave reducing structure for inhibiting stray light.

SUMMARY OF THE INVENTION

Incidentally, cameras in recent years have a wide viewing angle, and a bottom surface portion having a reflected wave reducing structure on a lens hood has been increased accordingly. In this case, as a viewing angle of the camera becomes wider, a formation angle of the bottom surface portion and the reflected wave reducing structure also becomes wider, but if the reflected wave reducing structure is simply formed to be extended, it is unlikely that the surroundings of the reflected wave reducing structure will have a slacked appearance.

An aspect according to the present invention has been made in consideration of such circumstances, and an objective of the present invention is to improve the appearance around a reflected wave reducing structure of a sensor hood in transport equipment and sensor brackets in which a sensor hood having a reflected wave reducing structure is provided.

In order to solve the above-described problem and achieve the objective, the present invention employs the following aspects.

(1) A transportation equipment according to one aspect of the present invention is transport equipment including an external environment detection sensor which detects electromagnetic waves, and a sensor bracket supported by a transport equipment main body, in which the sensor bracket includes a sensor hood which surrounds a detection space extending in a detection direction from a detection unit side of the external environment detection sensor, the sensor hood includes a surface forming part which forms a flat-shaped surface facing the detection space, the surface extends in the detection direction from the detection unit side and includes a reflected wave reducing structure that reduces reflected waves reaching the detection unit on the surface, and the surface forming part includes a partition part that partitions the reflected wave reducing structure into a plurality of regions.

According to the above-described aspect (1), the partition part that partitions the reflected wave reducing structure into the plurality of regions is formed on the surface forming part that forms the flat-shaped surface having the reflected wave reducing structure of the sensor hood, and thereby the partition part serves as a visual accent of the reflected wave reducing structure and gives a change in appearance of the reflected wave reducing structure. That is, if a detection range of the external environment detection sensor is extended, although the reflected wave reducing structure is also extended accordingly, simply extending the reflected wave reducing structure affects the appearance, but when the partition part is intentionally provided in the reflected wave reducing structure, design quality of the reflected wave reducing structure can be improved, and an appearance around the reflected wave reducing structure can be improved.

The term "flat-shaped" described above means that there is substantially no large step, bending, or the like and includes a case in which a gentle curve, irregularities for fixing or reinforcement, or the like are present.

(2) In the above-described aspect (1), the partition part may include stepped surfaces which are formed on the surface of the surface forming part.

According to the above-described aspect (2), the stepped surfaces can be formed at the same time when the surface forming part is formed, and thus a segmented design of the reflected wave reducing structure can be easily provided. For example, although the surface of the sensor hood is inclined further away from the detection central axis with distance away from the detection unit in the detection direction, when the region separated in the detection direction is changed to be separated from the detection central axis by interposing the stepped surfaces in accordance with the inclination, the stepped surfaces do not face the detection unit side and reflection of light or the like from the stepped surfaces to the detection unit side can be inhibited.

(3) In the above-described aspect (2), the reflected wave reducing structure may be irregularities formed on the surface, and the stepped surfaces of the partition part may form steps having a difference in height from the irregularities of the reflected wave reducing structure.

According to the above-described aspect (3), even if the reflected wave reducing structure has irregularities on the surface, since the stepped surfaces of the partition part are formed to have steps having a difference in height from the irregularities of the reflected wave reducing structure, the partition part can form a visual accent of the reflected wave reducing structure and give a change in appearance of the reflected wave reducing structure.

(4) In the above-described aspect (2) or (3), when a direction perpendicular to the detection direction in a plan view on the surface is a surface width direction, a direction perpendicular to the surface width direction in the plan view on the surface is a surface front-rear direction, and a direction perpendicular to the surface width direction and the surface front-rear direction is a height direction, the partition part may partition the reflected wave reducing structure into a plurality of vertical regions in the surface width direction, and, a front region including the front of the detection unit among the plurality of vertical regions may be disposed closer to a detection central axis of the detection unit in the height direction than the vertical regions positioned outward from the front region in the surface width direction are.

According to the above-described aspect (4), the reflected wave reducing structure is partitioned into the plurality of vertical regions in the surface width direction, and the front region of the detection unit is disposed to be higher (closer to the detection central axis) than the vertical regions on the outer side in the surface width direction, and thereby the stepped surfaces between the front region and the outer vertical regions do not face the detection unit side, and reflection of light or the like from the stepped surfaces to the detection unit side can be inhibited.

(5) In the above-described aspect (4), in the plurality of vertical regions, the vertical region may be disposed further away from the detection central axis in the height direction as the vertical region is positioned further outward in the surface width direction.

According to the above-described aspect (5), the vertical region on an outer side in the surface width direction is disposed to be lower (away from the detection central axis) than the vertical region on an inner side in the surface width direction, and thereby the stepped surfaces between the vertical regions adjacent in the surface width direction do not face the detection unit side, and reflection of light or the like from the stepped surfaces to the detection unit side can be inhibited.

(6) In the above-described aspect (4) or (5), when a direction perpendicular to the detection direction in a plan view on the surface is a surface width direction, a direction perpendicular to the surface width direction in the plan view on the surface is a surface front-rear direction, and a direction perpendicular to the surface width direction and the surface front-rear direction is a height direction, the partition part may partition the reflected wave reducing structure into a plurality of horizontal regions in the surface front-rear direction, and the plurality of horizontal regions may be disposed further away from the detection central axis in the height direction as the horizontal region is farther from the detection unit in the detection direction in the surface front-rear direction.

According to the above-described aspect (6), the horizontal region is disposed to be lower (away from the detection central axis) as the horizontal region is farther from the detection unit in the detection direction, and thereby the stepped surfaces between horizontal regions adjacent in the surface front-rear direction do not face the detection unit side, and reflection of light or the like from the stepped surfaces to the detection unit side can be inhibited. Also, although the surface of the sensor hood is inclined further away from the detection central axis with distance away from the detection unit in the detection direction, the plurality of horizontal regions can be disposed with heights thereof naturally changing in accordance with the inclination.

(7) In any one of the above-described aspects (1) to (6), the partition part may include at least one of a line and a pattern drawn on the surface, a switching part of treatments on the surface, and a segmented part when the surface forming part has a segmented structure.

According to the above-described aspect (7), a segmented design of the reflected wave reducing structure can be easily provided by at least one of a line and a pattern drawn on the surface of the surface forming part, switching of treatments such as colors, surface treatments, shapes on the surface, and a segmented part when the surface forming part has a segmented structure.

(8) A sensor bracket according to one aspect of the present invention is a sensor bracket supported by a transportation device body and includes a sensor hood which surrounds a detection space extending in a detection direction from a detection unit side of the external environment detection sensor which detects electromagnetic waves, in which the sensor hood includes a surface forming part which forms a flat surface facing the detection space, the surface extends to spread radially in the detection direction from the detection unit side and includes a reflected wave reducing structure that reduces reflected waves reaching the detection unit on the surface, and the surface forming part includes a partition part that partitions the reflected wave reducing structure into a plurality of regions.

According to the aspects of the present invention, in transport equipment and sensor brackets in which a sensor hood having a reflected wave reducing structure is provided, an appearance around the reflected wave reducing structure of the sensor hood can be improved.

BRIEF DESCRIPTION OF THE DRAWINGS

FIG. 14A is a plan view of the reflected wave reducing structure of the camera hood.

FIG. 14B is an enlarged view of the XIVB portion of FIG. 14A and illustrates a third example of the partition part of the reflected wave reducing structure.

DETAILED DESCRIPTION OF THE INVENTION

Figure 1:
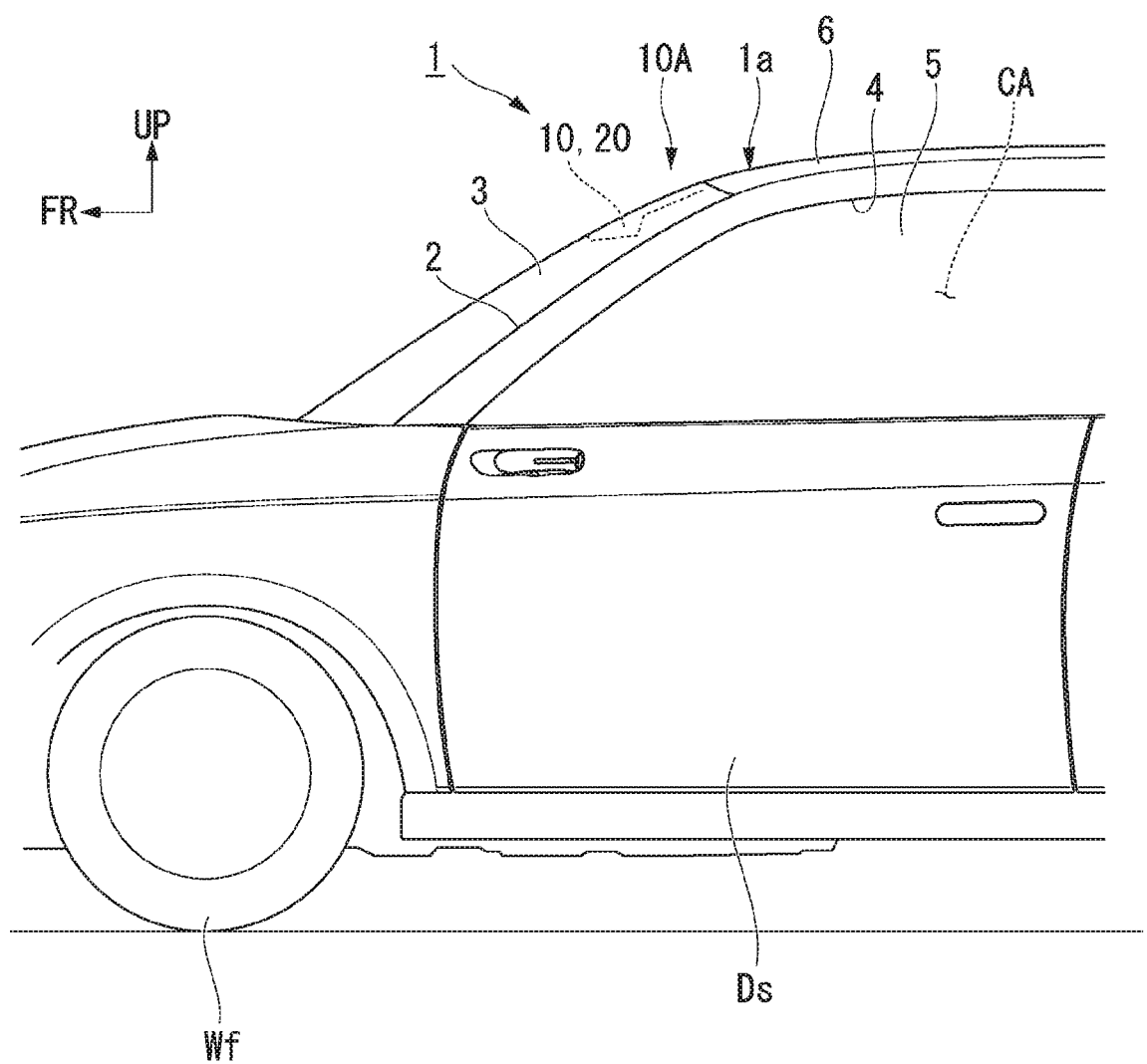
FIG. 1 is a left side view of a main portion of a vehicle in an embodiment of the present invention.

Hereinafter, embodiments of the present invention will be described with reference to the drawings. In the following description, directions such as forward, rearward, left, and right are the same as directions in a vehicle 1 to be described below unless otherwise specified. Also, an arrow FR indicating the front of the vehicle, an arrow LH indicating the left of the vehicle, and an arrow UP indicating an upper side of the vehicle, and a line CL1 indicating a vehicle left-right center are illustrated at suitable positions in the drawings used for the following description.

FIG. 1 is a left side view of a main portion of the vehicle 1 of the present embodiment.

As illustrated in FIG. 1, the vehicle (transport equipment) 1 of the present embodiment includes a front window (window) 2 and a front window glass (windshield) 3 in front of a passenger compartment CA, and includes a side window (window) 4 and a side window glass 5 on a lateral side of the passenger compartment CA.

Reference 6 denotes a roof above the passenger compartment CA, reference Wf denotes a front wheel, reference Ds denotes a side door, and reference 1a denotes a vehicle main body (transport equipment main body) 1a. The vehicle main body 1a of the present embodiment is a portion other than an external environment detection camera 10 and a camera bracket 20 of the vehicle 1 (an object to which the external environment detection camera 10 and the camera bracket 20 are attached).

The external environment detection camera 10 as an external environment detection sensor is installed on an inner surface 3a side (passenger compartment CA side) of an upper portion and a left-right central portion of the front window glass 3. The external environment detection camera 10 may be, for example, a digital camera utilizing a solid-state image sensing device such as a charge coupled device (CCD) or a complementary metal oxide semiconductor (CMOS). For example, the external environment detection camera 10 may periodically repeat imaging of the front of the vehicle. Information detected by the external environment detection camera 10 is used to recognize a position, a type, a speed, and the like of an object in a detection direction, and on the basis of this recognition, driving assist control, automatic driving control, and the like of the vehicle 1 are performed. Reference 10A denotes an attachment structure of the external environment detection sensor (camera).

Figure 2:
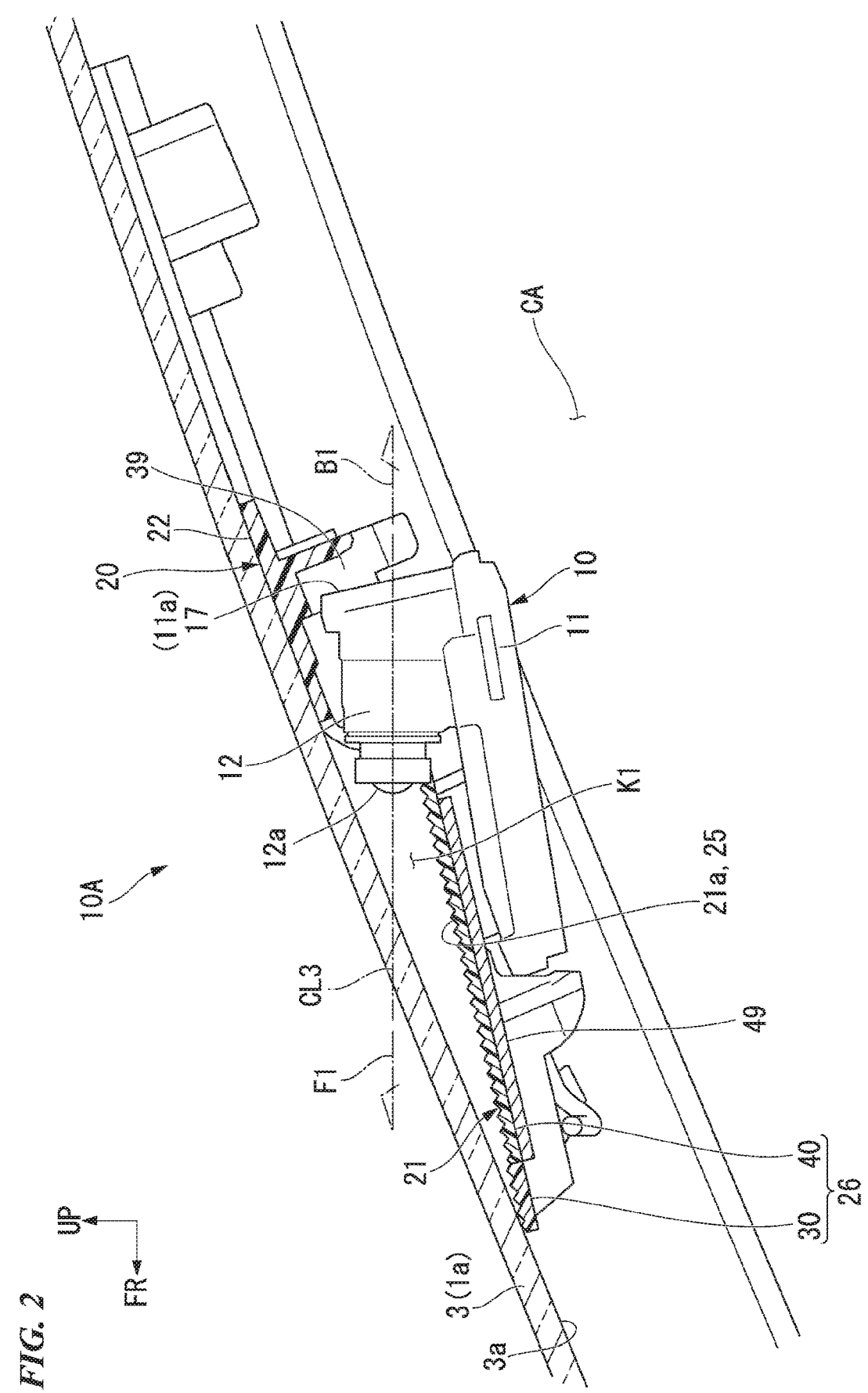
FIG. 2 is a left side view including a partial cross section around an external environment detection camera of the vehicle in the embodiment of the present invention.
Figure 3:
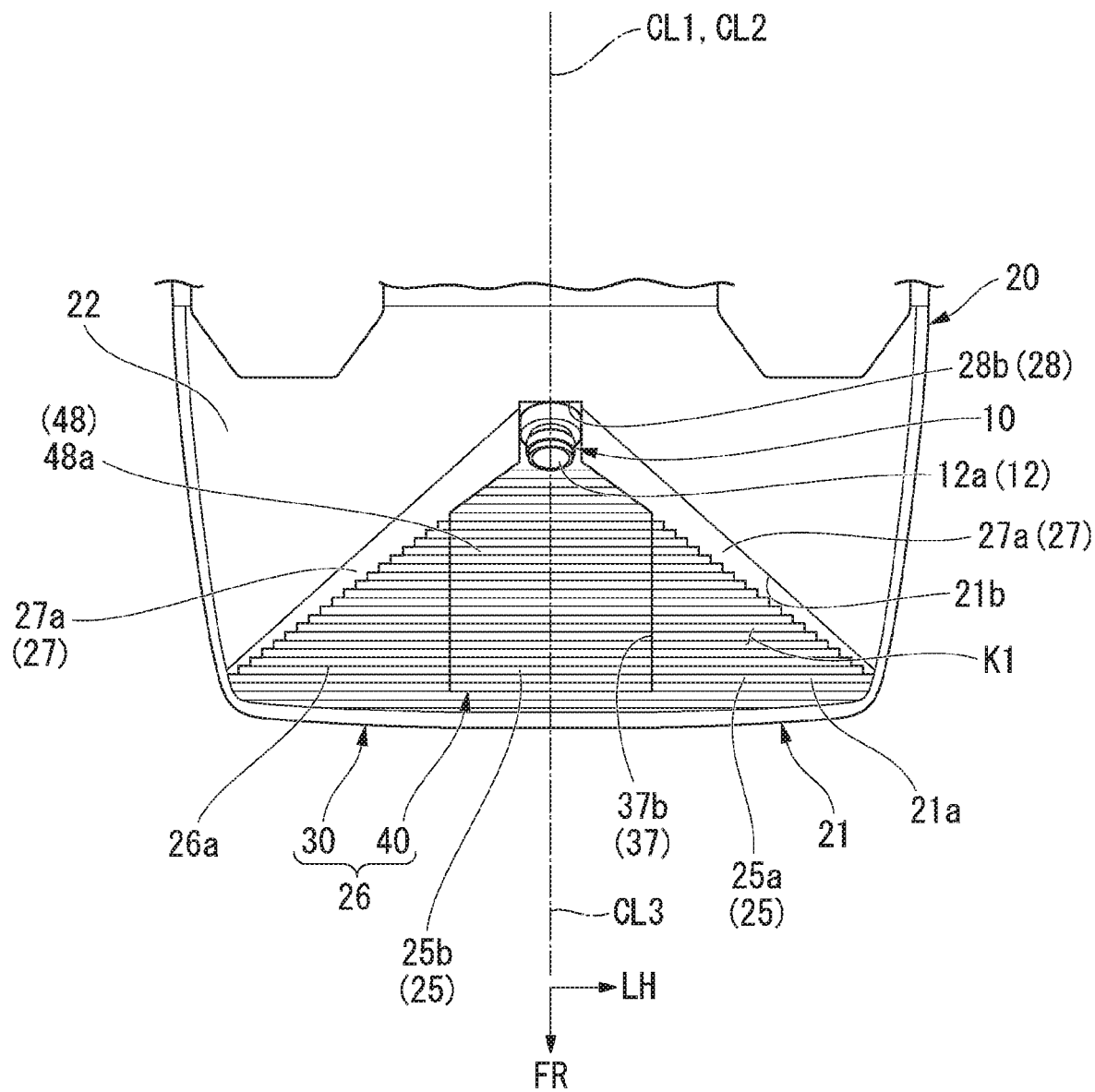
FIG. 3 is a plan view of a camera bracket which supports the external environment detection camera when viewed from a surface side.
Figure 4:
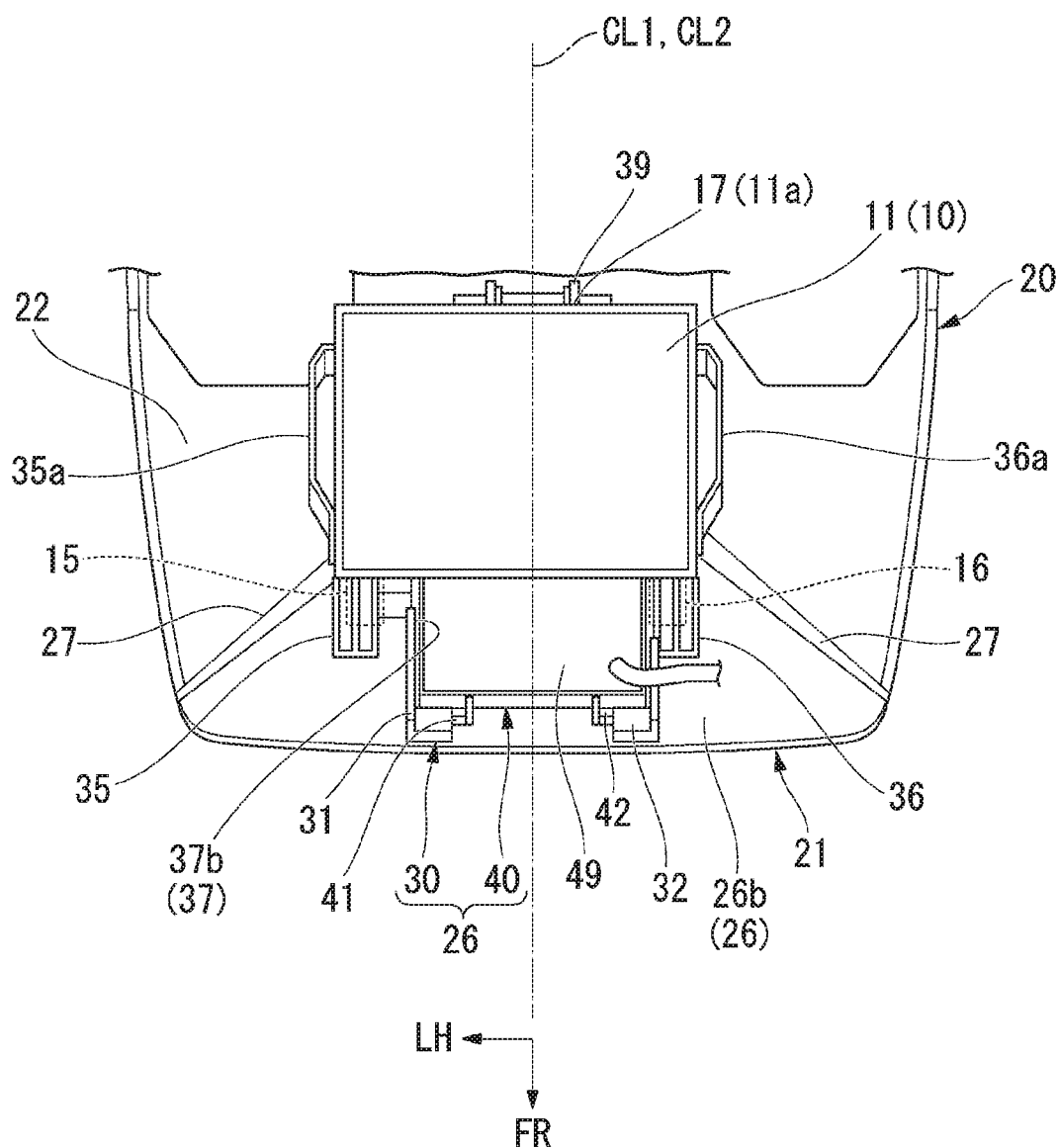
FIG. 4 is a plan view of the camera bracket which supports the external environment detection camera when viewed from a back surface side.

FIG. 2 is a left side view including a partial cross section around the external environment detection camera 10 of the vehicle 1, FIG. 3 is a plan view of the camera bracket 20 which supports the external environment detection camera 10 when viewed from a surface side (a bottom surface 26a side in a thickness direction of a bottom surface forming part 26 to be described below), and FIG. 4 is a plan view of the camera bracket 20 which supports the external environment detection camera 10 when viewed from a back surface side (a back surface 26b side in the thickness direction of the bottom surface forming part 26 to be described below). Further, covers for covering a vicinity of the external environment detection camera 10 from the passenger compartment side are not illustrated.

As illustrated in FIGS. 2 to 4, the external environment detection camera 10 includes a flat main body part 11 in which a thickness in the vertical direction is reduced, and a cylindrical lens 12 disposed on an upper side of a rear portion of the main body part 11.

The lens 12 is disposed with an optical axis CL3 as a central axis being substantially horizontal and a lens surface 12a facing the front of the vehicle (a detection direction). In FIG. 2, an arrow F1 indicates the detection direction along the optical axis CL3 of the external environment detection camera 10, and an arrow B1 indicates a direction opposite to the detection direction. In the present embodiment, the detection direction is one direction directed to the front of the vehicle, and the opposite direction is one direction directed to the rear of the vehicle. That is, in the optical axis direction which is bidirectional, one direction is the detection direction and the other direction is the opposite direction. The external environment detection camera 10 is configured to be substantially bilaterally symmetrical with respect to the optical axis CL3 in external appearance.

The external environment detection camera 10 is fixed to the inner surface 3a of the front window glass 3 that is inclined upward to the rear via the camera bracket 20. The camera bracket 20 is an injection-molded product made of, for example, a synthetic resin, and is affixed to the inner surface 3a of the front window glass 3 with an adhesive or the like. The camera bracket 20 is provided along an inclination of the front window glass 3, and the external environment detection camera 10 is attached to the camera bracket 20 from the passenger compartment side. A camera cover (not illustrated) covers a vicinity of the camera bracket 20 and the external environment detection camera 10 from the passenger compartment side.

Figure 9:
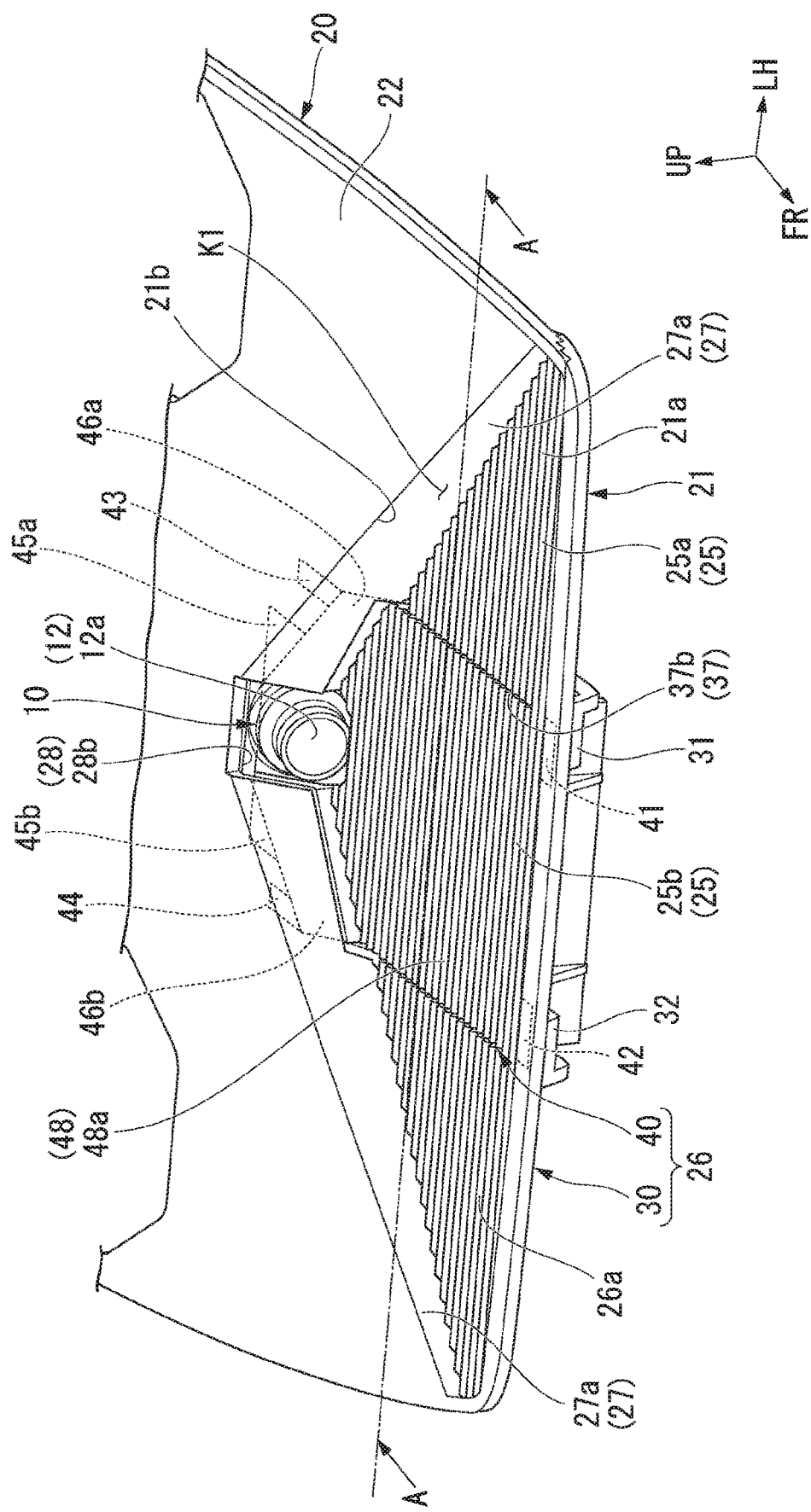
FIG. 9 is a perspective view of the camera bracket that supports the external environment detection camera.

Referring also to a perspective view of FIG. 9, a lens hood 21 surrounding a detection space K1 extending in the detection direction from the lens 12 side of the external environment detection camera 10 and an affixing part 22 affixed to the inner surface 3a of the front window glass 3 are integrally formed in the camera bracket 20. A lens opening part 28 that forms an opening 28b that exposes the lens 12 of the external environment detection camera 10 from the passenger compartment side into the lens hood 21 is provided at a substantially central portion of the camera bracket 20. The lens hood 21 is formed to extend a left-right width toward the front side from the lens opening part 28 to the front.

The optical axis (a detection central axis) CL3 of the lens 12 passes through the detection space K1 from a center of the lens 12 and reaches the front window glass 3 that closes an opening 21b of the lens hood 21.

The lens hood 21 includes the bottom surface forming part 26 that forms the bottom surface 26a that faces the detection space K1 from below, and a side surface forming part 27 that forms a side surface 27a that faces the detection space K1 from left and right sides. The bottom surface 26a is parallel to a vehicle left-right direction and is a flat surface inclined downward to the front with respect to a vehicle front-rear direction and the optical axis CL3 in a side view. The bottom surface 26a and thus the bottom surface forming part 26 are formed in a triangular shape that extends the left-right width toward the front side in a plan view from a direction perpendicular to the bottom surface 26a. The term "in a plan view" of the present embodiment refers to viewing in a direction perpendicular to the bottom surface 26a unless otherwise specified, and the term "plan view" of the present embodiment refers to a plan view seen in a direction perpendicular to the bottom surface 26a unless otherwise specified. The bottom surface 26a is not limited to a flat surface in a strict sense and may be a reference plane (virtual plane) for forming (arranging) fine irregularities of a reflected wave reducing structure 25 to be described below.

Hereinafter, a direction (bidirectional, a left-right direction along the bottom surface 26a) perpendicular to a detection direction F1 in a plan view of the bottom surface 26a is referred to as a surface width direction X1, a direction (bidirectional, a front-rear direction along the bottom surface 26a) perpendicular to the surface width direction X1 in a plan view of the bottom surface 26a is referred to as a surface front-rear direction Y1, and a direction (bidirectional, a vertical direction perpendicular to the bottom surface 26a) perpendicular to the surface width direction X1 and the surface front-rear direction Y1 is referred to as a height direction Z1. Viewing from the height direction Z1 corresponds to the plan view.

The bottom surface 26a that is wide in the surface width direction X1 is formed on the lens hood 21, and the reflected wave reducing structure 25 is also formed wide in the surface width direction X1 accordingly. The bottom surface 26a has a radially extending form in which the left-right width extends with distance away from the lens 12 according to an angle of view of the lens 12. The bottom surface 26a widens in the surface width direction X1 with distance away from the lens 12 in the detection direction F1. The bottom surface 26a is not limited to a complete plane and may have a flat shape in which there is substantially no large step, bending, or the like (including presence of a gentle curve, irregularities for fixing, reinforcement, or the like). When the bottom surface 26a curves gently, for example, a direction along a straight line crossing both ends of the bottom surface 26a is the surface width direction X1.

The side surface 27a and thus the side surface forming part 27 are formed to be bent and rise upward and rearward from left and right inclined side portions on both sides of the rear portion of the bottom surface forming part 26. The side surface 27a is formed to gradually reduce a height erected upward and rearward from left and right edge portions of the lens opening part 28 toward both left-right end portions of a front edge portion of the bottom surface forming part 26. A vertical width of the side surface 27a is smaller than the left-right width of the bottom surface 26a, and thus the lens hood 21 and the detection space K1 are formed in a flat shape in which the vertical width is reduced.

An upper surface portion of the lens hood 21 forms an opening 21b positioned in the detection direction of the external environment detection camera 10. The opening 21b is formed to be surrounded by an upper edge portion of the lens opening part 28, upper edge portions of the side surface forming parts 27 on the left and right sides, and the front edge portion of the bottom surface forming part 26. The opening 21b is closed by the inner surface 3a of the front window glass 3 in a state in which the lens hood 21 and thus the camera bracket 20 are fixed to the front window glass 3. The front window glass 3 is an example of a transmission member that is disposed in the detection direction of the external environment detection camera 10 and transmits light (electromagnetic waves) detected by the external environment detection camera 10.

The lens hood 21 includes the reflected wave reducing structure (stray light shield (SLS)) 25 that reduces reflected light (reflected wave) reaching the lens 12 on at least a portion (the bottom surface 26a in this embodiment) of a surface 21a (the bottom surface 26a and the left and right side surfaces 27a) facing the detection space K1. The reflected wave reducing structure 25 of the present embodiment may be formed such that, for example, a plurality of wave shapes having a triangular shaped cross section and extending along the left-right direction are aligned in the front-rear direction. Due to the reflected wave reducing structure 25, stray light (stray light, reflected wave) reaching the lens 12 of the external environment detection camera 10 is inhibited.

When the reflected wave reducing structure 25 having a three-dimensional shape such as a wave shape is provided, the bottom surface 26a is a reference plane (virtual plane) when the three-dimensional shape is formed. A plurality of pattern shapes such as the wave shape of the reflected wave reducing structure 25 are arranged along the reference plane. The pattern shape is not limited to one having a regular pitch and may have a predetermined change or may be irregular. Also, the pattern shape is not limited to a three-dimensional shape and may be one that has been subjected to a surface treatment such as embossing or painting. The reflected wave reducing structure 25 may be provided on the side surface 27a of the lens hood 21.

A line CL2 in FIGS. 3 and 4 indicates a left-right center of the camera bracket 20. The camera bracket 20 is configured to be substantially bilaterally symmetrical with respect to the line CL2. The left-right center CL2 of the camera bracket 20 is coincident with the vehicle left-right center CL1 in a plan view. The optical axis CL3 of the external environment detection camera 10 is coincident with the left-right center CL2 of the camera bracket 20 and the vehicle left-right center CL1 in a plan view. For example, when the external environment detection camera 10 is installed to be shifted from the vehicle left-right center CL1 or the like, the left-right center CL2 of the camera bracket 20 may be disposed to be shifted from the vehicle left-right center CL1, and the optical axis CL3 of the external environment detection camera 10 may be disposed to be shifted from the left-right center CL2 of the camera bracket 20. Also, the camera bracket 20 and the external environment detection camera 10 may be configured to be bilaterally asymmetrical.

Referring to FIGS. 3 and 9, the bottom surface forming part 26 that forms the bottom surface 26a having the reflected wave reducing structure 25 of the lens hood 21 is divided into a fixed body 30 including a portion of the reflected wave reducing structure 25 (a fixed-side structure portion 25a) and fixed to the vehicle main body 1a (for example, the front window glass 3), and a segment body 40 that is configured to be separable from the fixed body 30 including the remaining other portion (a segment-side structure portion 25b) of the reflected wave reducing structure 25. The fixed body 30 has the affixing part 22 integrally formed therein and can be regarded as the integral fixed body 30 having the affixing part 22.

Referring to FIGS. 4 to 8 together, the segment body 40 is provided in a substantially rectangular range that overlaps the optical axis CL3 in a plan view. Specifically, a flat plate part 48 (see FIGS. 7 and 8) that forms a schematic shape of the segment body 40 in a plan view includes a front side portion 40a1 extending in the vehicle left-right direction, left and right side portions 40a2 extending in the vehicle front-rear direction, left and right rear inclined side portions 40a3 extending obliquely to be positioned forward toward the sides outward to the left and right, and a rear central notch portion 40a4 formed between inner ends of the left and right rear inclined side portions 40a3. A fixed-side opening part 37 that forms a substantially rectangular opening 37b matching the segment body 40 is provided in the fixed body 30. In a state in which the segment body 40 is attached to the fixed-side opening part 37, the fixed body 30 and the segment body 40 are disposed such that surfaces thereof constituting the bottom surface 26a are coplanar with each other or parallel to each other. When the reflected wave reducing structure 25 is provided on the side surface 27a of the lens hood 21, the segment body 40 including a portion of the side surface forming part 27 may be provided.

The external environment detection camera 10 is attached to the fixed body 30 side (the back surface 26b side) of the bottom surface forming part 26. In the external environment detection camera 10, a first sensor fixed part 15 is provided to protrude toward the front on the left side of a front end portion of the main body part 11, and a second sensor fixed part 16 is provided to protrude toward the front on the right side of the front end portion of the main body part 11. On the back surface 26b of the bottom surface forming part 26, a first sensor fixing part 35 corresponding to the first sensor fixed part 15 is provided to protrude downward on the left side of the fixed-side opening part 37, and a second sensor fixing part 36 corresponding to the second sensor fixed part 16 is provided to protrude downward on the right side of the fixed-side opening part 37.

The first sensor fixed part 15 and the second sensor fixed part 16 move rearward (while moving toward the rear) along the back surface 26b of the bottom surface forming part 26 to be inserted into the first sensor fixing part 35 and the second sensor fixing part 36. Thereby, the first sensor fixed part 15 and the second sensor fixed part 16 are in an unfastened engagement state with the first sensor fixing part 35 and the second sensor fixing part 36. The term "unfastened engagement state" in the present embodiment means that they are coupled without using a fastening member such as a bolt or a nut. Further, this may be substituted with a structure coupled using a fastening member. When the external environment detection camera 10 bridges between the first sensor fixing part 35 and the second sensor fixing part 36, deterioration in rigidity of the fixed body 30 due to provision of the fixed-side opening part 37 is suppressed.

A third sensor fixed part 17 is provided at a left-right central portion of a rear end portion 11a of the main body part 11 of the external environment detection camera 10. On the back surface 26b of the bottom surface forming part 26, a third sensor fixing part 39 corresponding to the third sensor fixed part 17 is provided to the rear of the fixed-side opening part 37. The third sensor fixed part 17 is elastically engaged with the third sensor fixing part 39 when the rear end portion 11a of the main body part 11 moves to approach the bottom surface forming part 26 from below. Thereby, the third sensor fixed part 17 and the third sensor fixing part 39 are in an unfastened engagement state.

The external environment detection camera 10 is attached to the fixed body 30 of the camera bracket 20 by the respective engagements between the sensor fixed parts 15 to 17 and the sensor fixing parts 35, 36, and 39. The external environment detection camera 10 overlaps the segment body 40 in a plan view.

Figure 5:
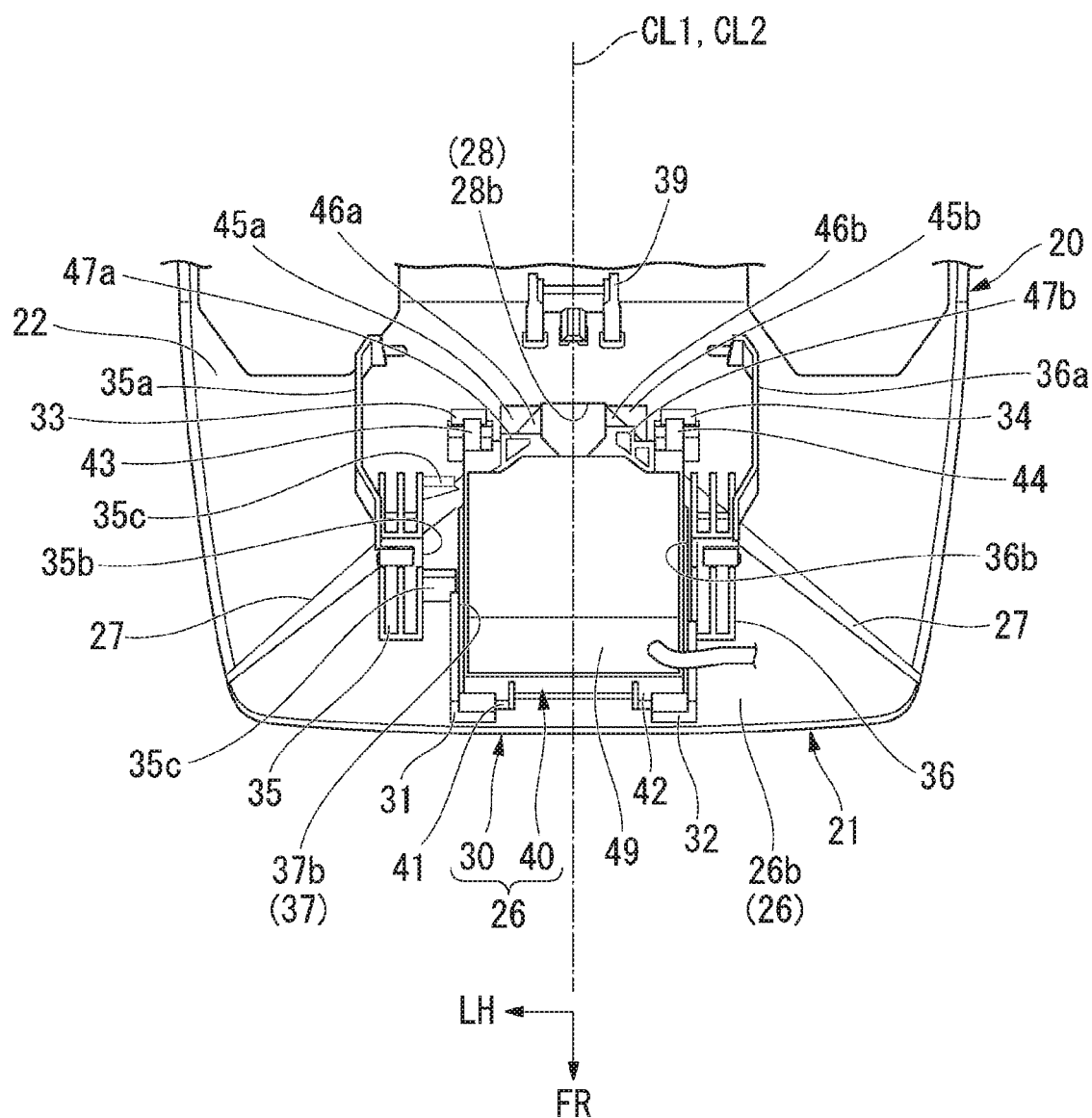
FIG. 5 is a plan view of a state in which the external environment detection camera is removed from FIG. 4.
Figure 6:
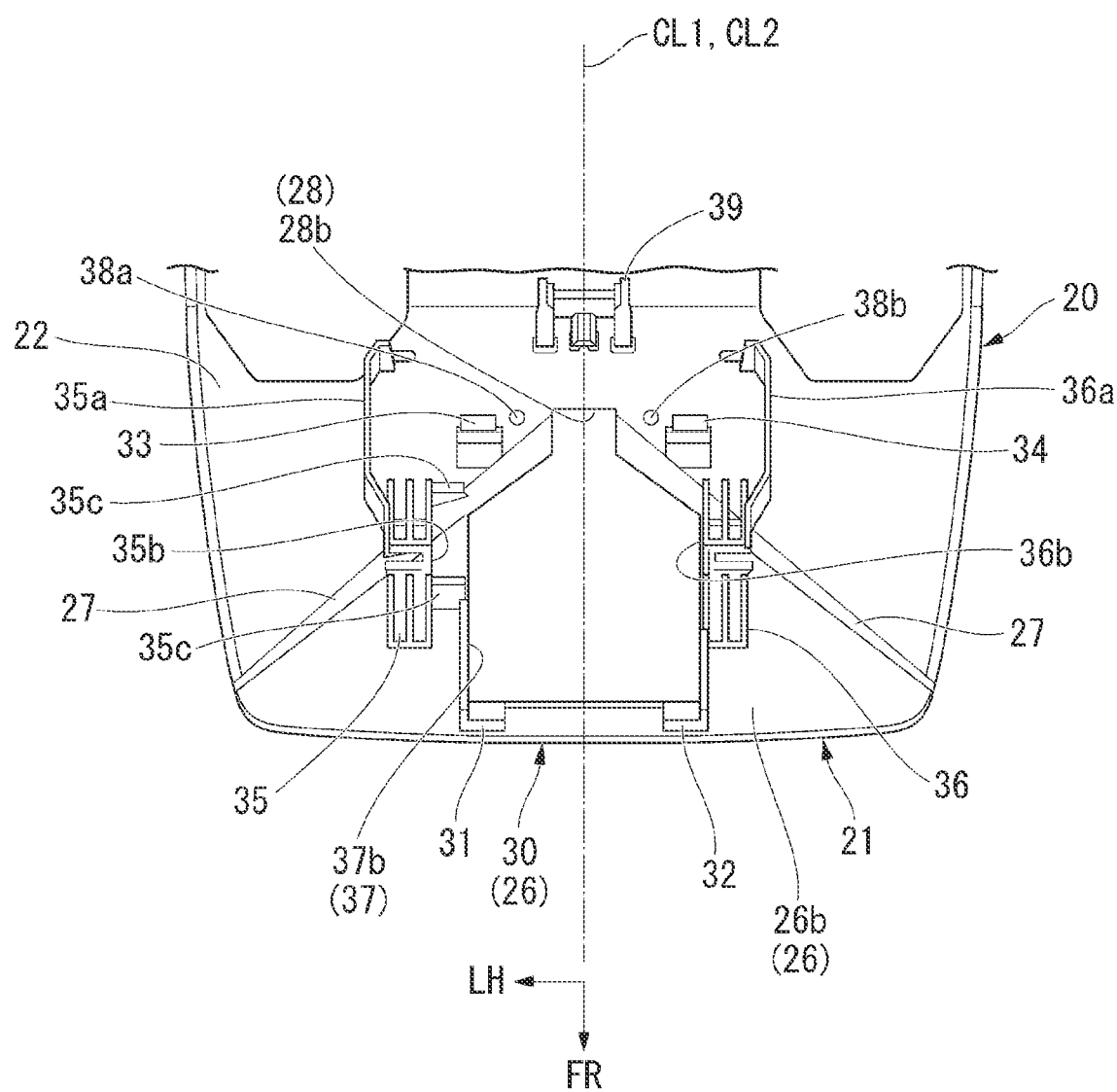
FIG. 6 is a plan view of a state in which a segment body is removed from FIG. 5.

FIG. 5 is a plan view of a state in which the external environment detection camera 10 is removed from FIG. 4, and FIG. 6 is a plan view of a state in which the segment body 40 is removed from FIG. 5.

As illustrated in FIGS. 4 to 6, on the back surface (the back surface 26b) of the camera bracket 20, a first rearward extending wall part 35a and a second rearward extending wall part 36a respectively extending along portions on left and right sides of the main body part 11 of the external environment detection camera 10 are provided to stand upright behind the first sensor fixing part 35 and the second sensor fixing part 36. The first rearward extending wall part 35a and the second rearward extending wall part 36a are erected in an overlapping direction (stacking direction) of the front window glass 3, the fixed body 30, and the external environment detection camera 10. The first rearward extending wall part 35a and the second rearward extending wall part 36a function as guides when the external environment detection camera 10 is attached. The main body part 11 of the external environment detection camera 10 is slightly bilaterally asymmetrical, and the first sensor fixing part 35 and the second sensor fixing part 36 are disposed to be also slightly bilaterally asymmetrical accordingly.

A first wall part 35b and a second wall part 36b extending in the vehicle front-rear direction are respectively provided at inner portions on left and right sides of the first sensor fixing part 35 and the second sensor fixing part 36. The first wall part 35b and the second wall part 36b are also erected in the stacking direction. The first wall part 35b and the second wall part 36b function as guides when the segment body 40 is attached. For example, a pair of front and rear ribs 35c may be provided on left and right inner sides of the first wall part 35b. The front and rear ribs 35c have left and right inner ends which are brought into close proximity with a left edge of the segment body 40, and the front and rear ribs 35c serve as attachment guides on the left side of the segment body 40.

Figure 7:
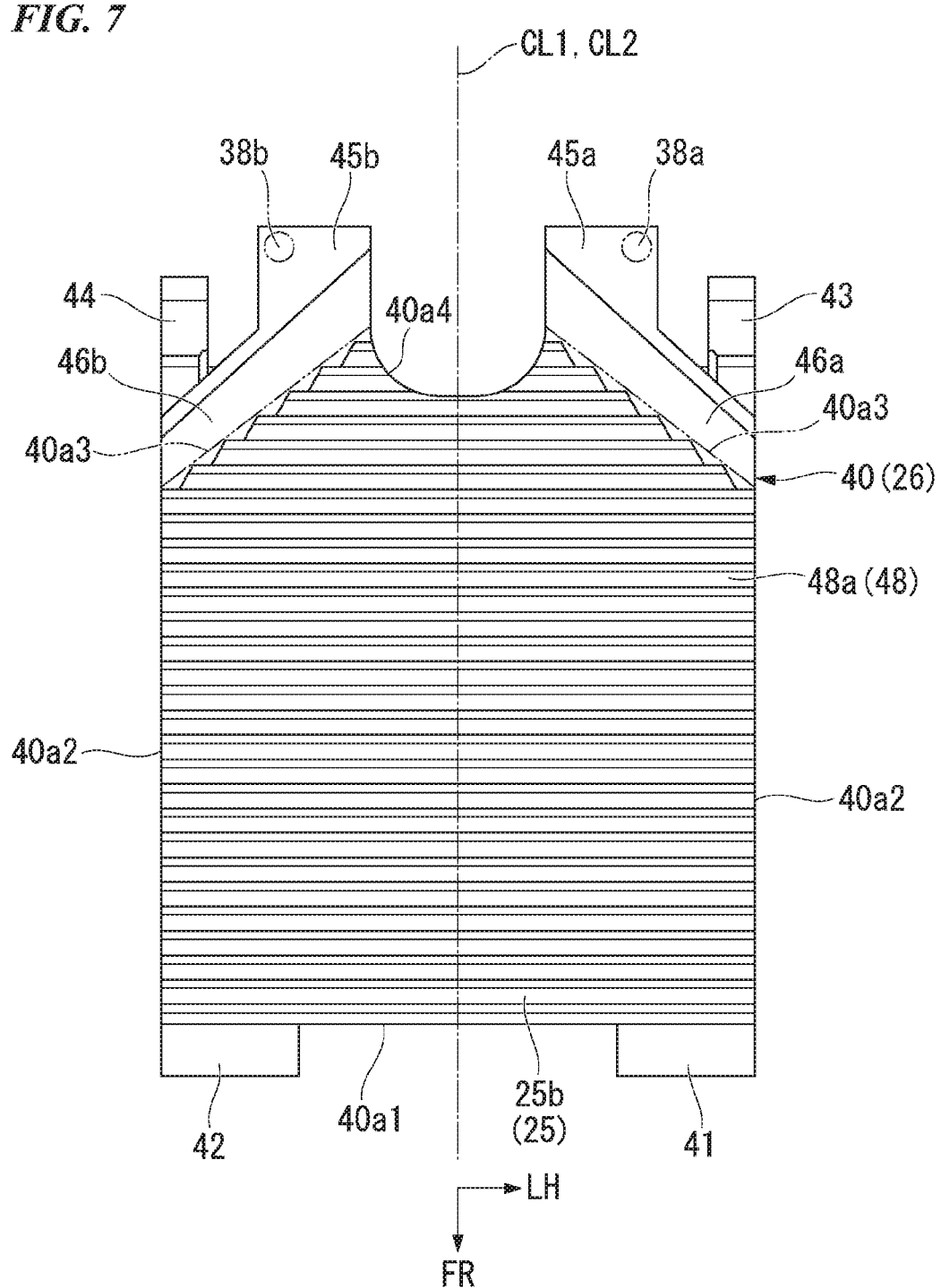
FIG. 7 is a plan view of the segment body when viewed from the surface side.
Figure 8:
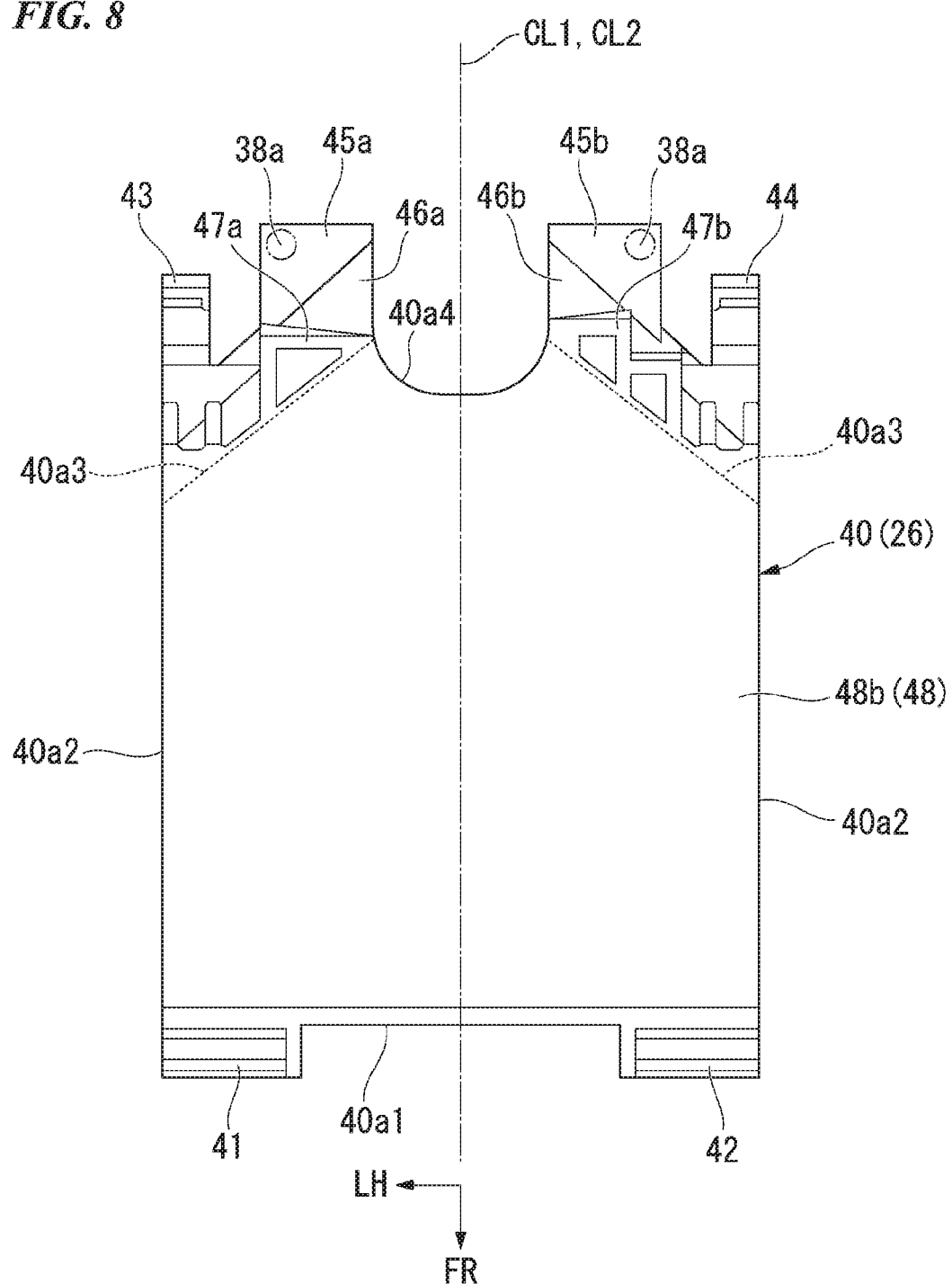
FIG. 8 is a plan view of the segment body when viewed from the back surface side.

FIG. 7 is a plan view of the segment body 40 when viewed from the surface side (a surface 48a side of the flat plate part 48, and the bottom surface 26a side), and FIG. 8 is a plan view of the segment body 40 when viewed from the back surface side (a back surface 48b side of the flat plate part 48, and the back surface 26b side).

Referring to FIGS. 7 and 8, the segment body 40 includes the flat plate part 48 having the reflected wave reducing structure 25 on one surface (the surface 48a) in a thickness direction. The flat plate part 48 includes the front side portion 40a1, the left and right side portions 40a2, the left and right rear inclined side portion 40a3, and the rear central notch portion 40a4 on an outer peripheral portion (referred to as an outer peripheral portion 40a of the segment body 40) in a plan view.

The front side portion 40a1 is formed at a front end portion of the flat plate part 48 and extends in the vehicle left-right direction in a plan view.

The left and right side portions 40a2 are formed at left and right end portions of the flat plate part and extend in the vehicle front-rear direction in a plan view.

The left and right rear inclined side portions 40a3 are formed at left and right rear end portions of the flat plate part and extend obliquely to be positioned forward toward the sides outward to the left and right in a plan view.

The rear central notch portion 40a4 is formed between the inner ends of the left and right rear inclined side portions 40a3 on rear left and right inner sides of the segment body 40 and has a semicircular shape that is convex forward in a plan view.

A first fixed part 41 and a second fixed part 42 protrude toward the front from portions on left and right sides of the front side portion 40a1. On the back surface 26b of the bottom surface forming part 26, a first fixing part 31 and a second fixing part 32 corresponding to the first fixed part 41 and the second fixed part 42 are respectively provided to protrude downward on the side in front of the fixed-side opening part 37. The first fixed part 41 and the second fixed part 42 are moved forward along the back surface 26b of the bottom surface forming part 26 to be inserted into the first fixing part 31 and the second fixing part 32, respectively. Thereby, the first fixed part 41 and the second fixed part 42 are in an unfastened engagement state with the first fixing part 31 and the second fixing part 32.

Here, the first fixed part 41 and the second fixed part 42 which are portions to be fixed on the segment body 40 side are formed to be weaker than the first fixing part 31 and the second fixing part 32 which are fixing portions on the fixed body 30 side. That is, the first fixed part 41 and the second fixed part 42 are formed to be weaker by at least one of, for example, providing a thin portion, a notch or the like, or making materials thereof different from those of the first fixing part 31 and the second fixing part 32. Thereby, when the segment body 40 is removed from the fixed body 30 or the like, even in a case in which these fixed portions are damaged, the fixed body 30 side can be protected due to breakage of the segment body 40 side.

A first protruding wall part 46a and a second protruding wall part 46b are erected toward the surface 48a side of the flat plate part 48 from the left and right rear inclined side portions 40a3, respectively. The protruding wall parts 46a and 46b are respectively formed to be bent upward and rearward and rise from the rear inclined side portions 40a3. The protruding wall parts 46a and 46b are respectively disposed to overlap back sides of the side surface forming parts 27 on the left and right sides of the fixed body 30. The protruding wall parts 46a and 46b form erected distal end portions substantially parallel to the rear inclined side portion 40a3s in a plan view. The protruding wall parts 46a and 46b are inclined with respect to a direction perpendicular to the surface 48a of the flat plate part 48 and formed substantially parallel to the side surface forming parts 27. The protruding wall part 46a and 46b are formed so that inner ends thereof on left and right inner sides are in the vehicle front-rear direction in a plan view. The inner ends of the protruding wall parts 46a and 46b are connected to left and right front ends of the rear central notch portion 40a4.

On the left and right inner sides of the erected distal end portions of the protruding wall parts 46a and 46b, a first elastic deformation piece 45a and a second elastic deformation piece 45b, which are substantially parallel to the surface 48a of the flat plate part 48, are respectively provided to protrude toward the side to the rear and outwardly to the left and right. Each of the elastic deformation pieces 45a and 45b is formed in a triangular shape in a plan view, and includes a rear side portion extending in the vehicle left-right direction in a plan view and an outer side portion extending in the vehicle front-rear direction in a plan view. Inner ends of the elastic deformation pieces 45a and 45b are continuous to the inner ends of the protruding wall parts 46a and 46b, and these are linearly formed in the vehicle front-rear direction until they reach the left and right front ends of the rear central notch portion 40a4 in a plan view.

On the back surface 26b of the bottom surface forming part 26, a first protruding part 38a and a second protruding part 38b corresponding to the elastic deformation pieces 45a and 45b are provided to protrude on a rear side of the fixed-side opening part 37. The elastic deformation pieces 45a and 45b are pressed by the protruding parts 38a and 38b of the fixed body 30 toward a side away from the fixed body 30. Thereby, engagements between a third fixed part 43 and a fourth fixed part 44, and a third fixing part 33 and a fourth fixing part 34, which will be described below, is strengthened, and a rear end portion of the segment body 40 is firmly fixed to the fixed body 30 without rattling.

On left and right outer sides of the erected distal end portions of the protruding wall parts 46a and 46b, the third fixed part 43 and the fourth fixed part 44 are respectively provided to protrude rearward while being spaced apart from left and right outer sides of the elastic deformation pieces 45a and 45b. On the back surface 26b of the bottom surface forming part 26, the third fixing part 33 and the fourth fixing part 34 corresponding to the third fixed part 43 and the fourth fixed part 44 are respectively provided to protrude downward on the rear side of the fixed-side opening part 37. When the rear end portion of the segment body 40 moves to approach the fixed body 30 from below, the third fixed part 43 and the fourth fixed part 44 are elastically engaged with the third fixing part 33 and the fourth fixing part 34. Thereby, the third fixed part 43 and the fourth fixed part 44 are in an unfastened engagement state with the third fixing part 33 and the fourth fixing part 34.

Since the third fixed part 43 and the fourth fixed part 44 are separated from the elastic deformation pieces 45a and 45b with a space therebetween, elastic deformation on one side cannot easily affect elastic deformation on the other side.

Here, the third fixed part 43 and the fourth fixed part 44 are also formed to be weaker than the corresponding third fixing part 33 and fourth fixing part 34. As a result, even in a case in which damage occurs when the segment body 40 is removed from the fixed body 30 or the like, the fixed body 30 side can be protected due to breakage of the segment body 40 side.

A first pressing part 47a and a second pressing part 47b which form pressing surfaces on the same plane with the back surface 48b of the flat plate part 48 are respectively provided to protrude on the back surface side of the protruding wall parts 46a and 46b. The pressing parts 47a and 47b respectively protrude rearward from the back surfaces of the protruding wall parts 46a and 46b and form the pressing surfaces in a triangular shape or the like in a plan view in front of the elastic deformation pieces 45a and 45b. A hollowed-out portion that opens to the back surface 48b side is appropriately formed at each of the pressing parts 47a and 47b. The pressing parts 47a and 47b are slightly bilaterally asymmetrical with respect to each other. Except for the pressing parts 47a and 47b, the segment body 40 is configured to be bilaterally symmetrical. The external environment detection camera 10 and the camera bracket 20 are likely to be laterally asymmetrical when used in different types of vehicles and sensor dispositions but can be easily used in a compatible manner when the segment body 40 is bilaterally symmetrical.

Here, the elastic deformation pieces 45a and 45b and the pressing parts 47a and 47b are disposed closer to the third fixed part 43 and the fourth fixed part 44 with respect to the first fixed part 41 and the second fixed part 42. Accordingly, when the pressing parts 47a and 47b are pressed when the segment body 40 is attached to the fixed body 30, the third fixed part 43 and the fourth fixed part 44 can be easily engaged with the fixed body 30, and the elastic deformation pieces 45a and 45b can be easily elastically deformed. For example, a sheet shaped heater 49 may be attached to the back surface 48b of the segment body 40. Functional components to be attached to the segment body 40 are not limited to the heater 49, and may be, for example, a room lamp, a car speaker, or the like.

<Regarding Gap in Reflected Wave Reducing Structure>

Figure 10:
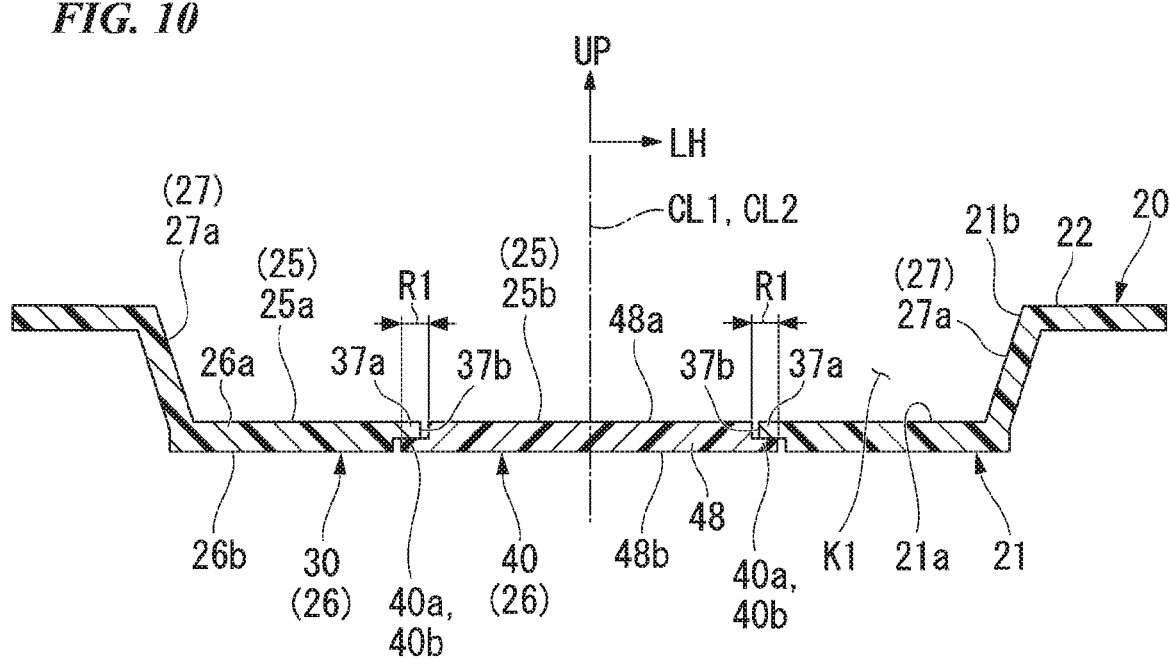
FIG. 10 is a cross-sectional view taken along line A-A in FIG. 9 and is a cross-sectional view illustrating a first example of an overlapping structure of the segment body and a fixed body.

FIG. 10 is a cross-sectional view taken along line A-A in FIG. 9 and illustrates a first example of an overlapping structure of the segment body 40 and the fixed body 30 described above.

When a gap is generated between the outer peripheral portion 40a of the segment body 40 and an inner peripheral portion 37a of the fixed-side opening part 37, light enters the lens hood 21 from the gap and becomes stray light, thereby affecting a detection accuracy of the external environment detection camera 10.

As illustrated in FIG. 10, in the present embodiment, an overlap (overlapping margin R1) is formed between the outer peripheral portion 40a of the segment body 40 and the inner peripheral portion 37a of the fixed-side opening part 37 in a direction along the back surface 26b of the bottom surface forming part 26. That is, the outer peripheral portion 40a of the segment body 40 includes an overlapping portion 40b that overlaps the inner peripheral portion 37a of the fixed-side opening part 37 from the back surface 26b side of the bottom surface forming part 26.

In the example of FIG. 10, the outer peripheral portion 40a of the segment body 40 and the inner peripheral portion 37a of the fixed-side opening part 37 have a staircase-like cross-sectional shape in which they are meshed with each other. The term "staircase-like cross-sectional shape in which they are meshed with each other" defines a position of the segment body 40 in a direction perpendicular to the back surface 26b of the bottom surface forming part 26 when the segment body 40 is fitted into the fixed-side opening part 37 from the back surface 26b side, and is a cross-sectional shape in which a surface including the segment-side structure portion 25b of the segment body 40 is disposed in parallel with a surface including the fixed-side structure portion 25a of the fixed body 30. In the direction along the back surface 26b of the bottom surface forming part 26, a gap is formed around the segment body 40 to allow a component tolerance or the like of the segment body 40 so that the segment body 40 is easily fitted into the fixed-side opening part 37.

Figure 11:
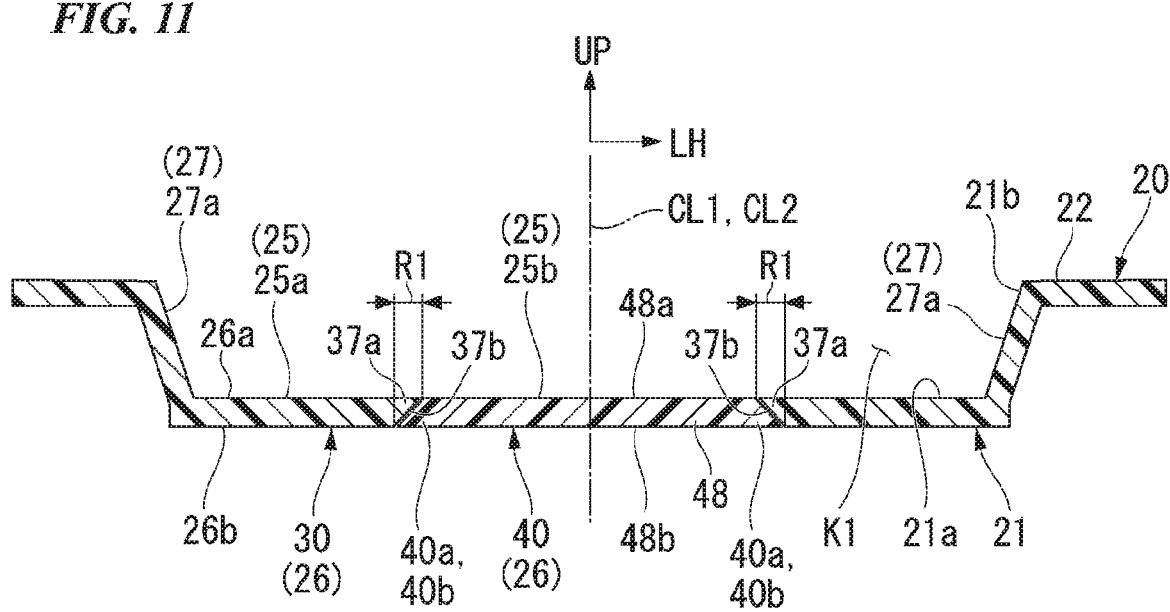
FIG. 11 is a cross-sectional view taken along line A-A in FIG. 9, and is a cross-sectional view illustrating a second example of an overlapping structure of the segment body and the fixed body.

FIG. 11 is a cross-sectional view taken along line A-A of FIG. 9 and illustrates a second example of the overlapping structure of the segment body 40 and the fixed body 30.

The cross-sectional shape in which the outer peripheral portion 40a of the segment body 40 and the inner peripheral portion 37a of the fixed-side opening part 37 are caused to overlap is not limited to the staircase-like cross-sectional shape described above and, for example, as illustrated in FIG. 11, the outer peripheral portion 40a of the segment body 40 and the inner peripheral portion 37a of the fixed-side opening part 37 may have an inclined cross-sectional shape in which they are meshed with each other. Also in this case, an overlap R1 is formed between the outer peripheral portion 40a of the segment body 40 and the inner peripheral portion 37a of the fixed-side opening part 37 in a direction along the back surface 26b of the bottom surface forming part 26. That is, the outer peripheral portion 40a of the segment body 40 includes the overlapping portion 40b that overlaps the inner peripheral portion 37a of the fixed-side opening part 37 from the back surface 26b side of the bottom surface forming part 26.

In the examples of FIGS. 10 and 11, it can be said that an edge on the bottom surface 26a of the fixed-side opening part 37 is on an inner side of the fixed-side opening part 37 with respect to an edge on the back surface 26b of the segment body 40. If this condition is satisfied, the overlapping structure of the segment body 40 and the fixed body 30 is not limited to the examples of FIGS. 10 and 11. As described above, when the segment body 40 and the fixed body 30 are disposed not to generate a gap therebetween in a direction along the surface (the bottom surface 26a) having the reflected wave reducing structure 25, even in a case in which the reflected wave reducing structure 25 is a divided structure, light entering the inside of the lens hood 21 can be inhibited.

<Segmented Design of Reflected Wave Reducing Structure>

Here, in the lens hood 21, as a viewing angle of the monocular camera 10 becomes wider, a formation angle of the bottom surface 26a and the reflected wave reducing structure 25 also becomes wider, but in this case, when the bottom surface 26a and the reflected wave reducing structure 25 are simply formed to be extended, it is unlikely that the surroundings of the bottom surface 26a and the reflected wave reducing structure 25 has a prolonged appearance.

In the present embodiment, as illustrated in FIGS. 12A to 15, a partition part 60 which is a visual partition with, for example, a stepped shape or the like is provided on the expanded bottom surface 26a and the reflected wave reducing structure 25, and thereby a segmented design (a design segmented into a plurality of regions) is given to the bottom surface 26a and the reflected wave reducing structure 25. Thereby, a visual accent is provided on the bottom surface 26a and the reflected wave reducing structure 25 to make it appear compact, and an impression that the bottom surface 26a and the reflected wave reducing structure 25 are too wide is avoided. Also, each of the plurality of partitioned regions is provided with the reflected wave reducing structure 25 to secure non-reflective characteristics, and thereby the bottom surface 26a secures non-reflective characteristics as a whole.

Figure 12A:
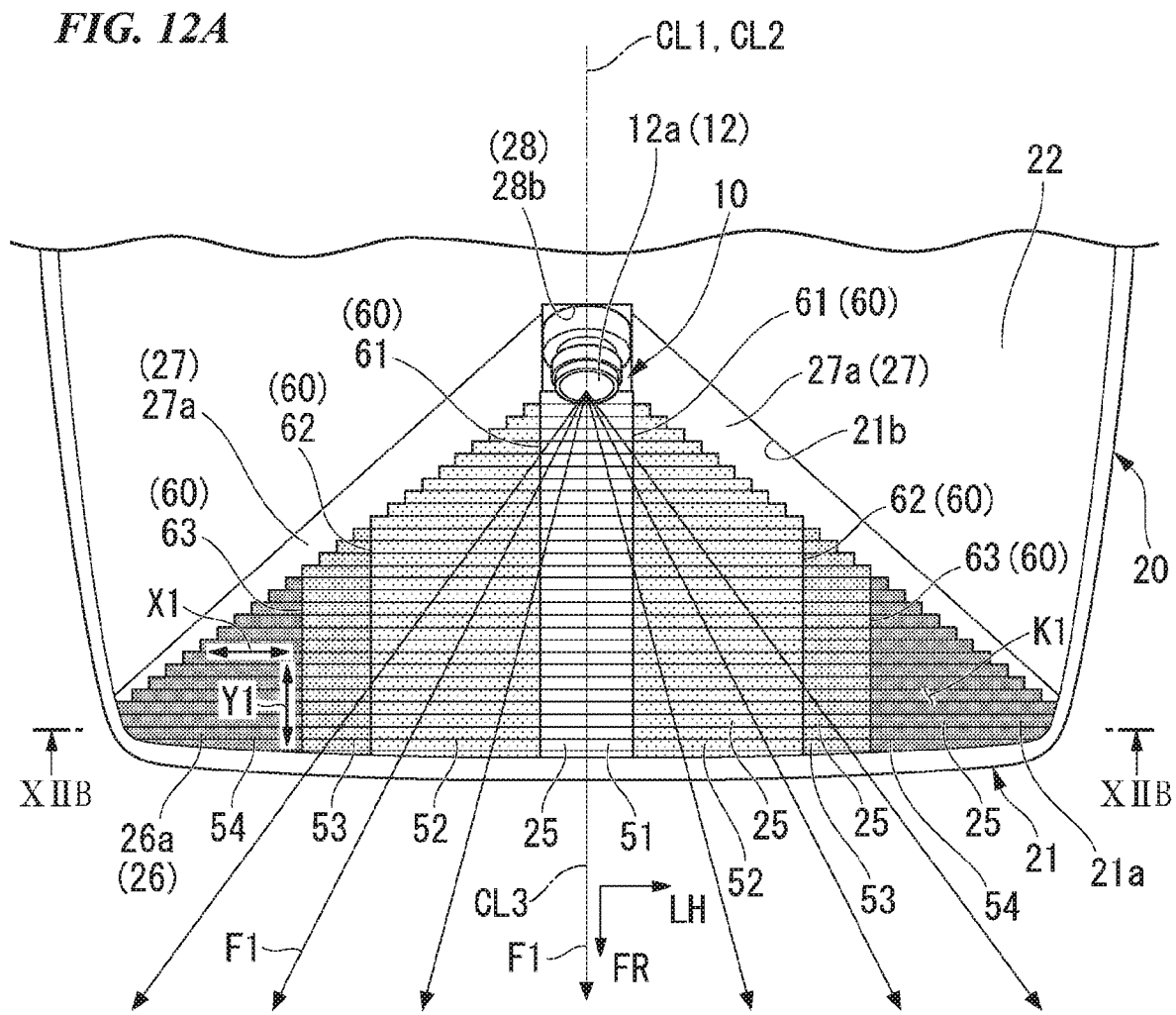
FIG. 12A is a plan view of a reflected wave reducing structure of a camera hood.
Figure 12B:
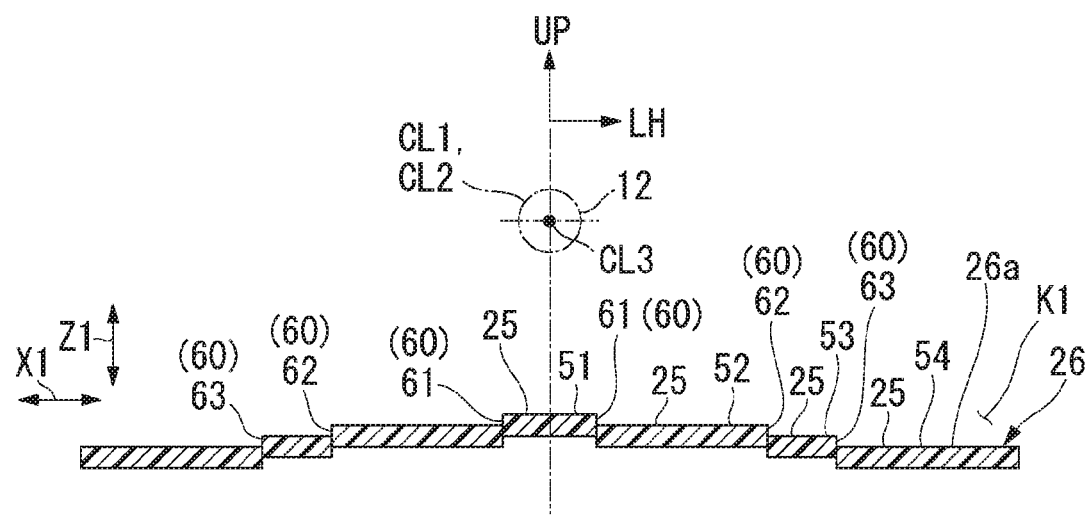
FIG. 12B is an enlarged view of the XIIB portion of FIG. 12A and illustrates a first example of a partition part of the reflected wave reducing structure.

FIGS. 12A and 12B illustrate an example in which the bottom surface 26a and the reflected wave reducing structure 25 are partitioned into a plurality of vertical regions 51 to 54 in the surface width direction X1 (the vehicle left-right direction in the embodiment). In the example of FIGS. 12A and 12B, the bottom surface 26a includes vertical stepped surfaces 61 to 63 as the partition part 60 extending in the surface front-rear direction Y1. The vertical stepped surfaces 61 to 63 in FIGS. 12A and 12B are formed to extend parallel to the detection direction F1 of the lens 12.

In front of the lens 12, the front region 51 including the optical axis CL3 is positioned at a center in the surface width direction X1 in a plan view among the plurality of vertical regions 51 to 54. The front region 51 is formed in a rectangular shape which is long in the surface front-rear direction Y1 in a plan view. The front region 51 is disposed at a highest position (a position close to the optical axis CL3 in the height direction Z1) on the radially extending bottom surface 26a of which the left-right width extends toward the front. Regions positioned on the sides outward to the left and right of the front region 51 (the second vertical region 52 to the fourth vertical region 54 in the example of FIGS. 12A and 12B) are disposed such that the positions are lowered stepwise toward the sides outward to the left and right.

Surfaces of the vertical regions 51 to 54 are disposed parallel to each other.

The vertical stepped surfaces 61 to 63 extending in the vehicle front-rear direction in a plan view are formed between the vertical regions 51 to 54 adjacent in the surface width direction X1. Each of the vertical stepped surfaces 61 to 63 faces sides outward to the left and right. That is, the vertical stepped surfaces 61 to 63 do not face the lens 12 side, and thus reflection of light or the like from the vertical stepped surfaces 61 to 63 to the lens 12 side is inhibited. Further, the bottom surface 26a and the reflected wave reducing structure 25 which are wide in the vehicle left-right direction are partitioned into the plurality of vertical regions 51 to 54 in the vehicle left-right direction, and thereby an impression that the bottom surface 26a and the reflected wave reducing structure 25 are too wide is avoided. Further, there may also be a configuration in which at least one of the vertical regions 52 to 54 on the sides outward to the left and right from the front region 51 is disposed at a higher position with respect to a vertical region adjacent on the side inward to the left or right so that the vertical stepped surfaces 61 to 63 between the vertical regions 51 to 54 face the side inward to the left or right that is, the lens 12 side. In this case, the reflected wave reducing structure 25 is preferably provided also on the vertical stepped surfaces 61 to 63 facing the lens 12 side. Further, a length (width) of the vertical region in the surface width direction X1 may be formed to become smaller as the region becomes closer to the lens 12 and formed to be larger as the region becomes further away from the lens 12 (not illustrated). Also, a length (width) of the vertical region in the surface width direction X1 may be formed to become larger as the region becomes closer to the lens 12 and formed to become smaller as the region becomes further away from the lens 12 (not illustrated).

Figure 13A:
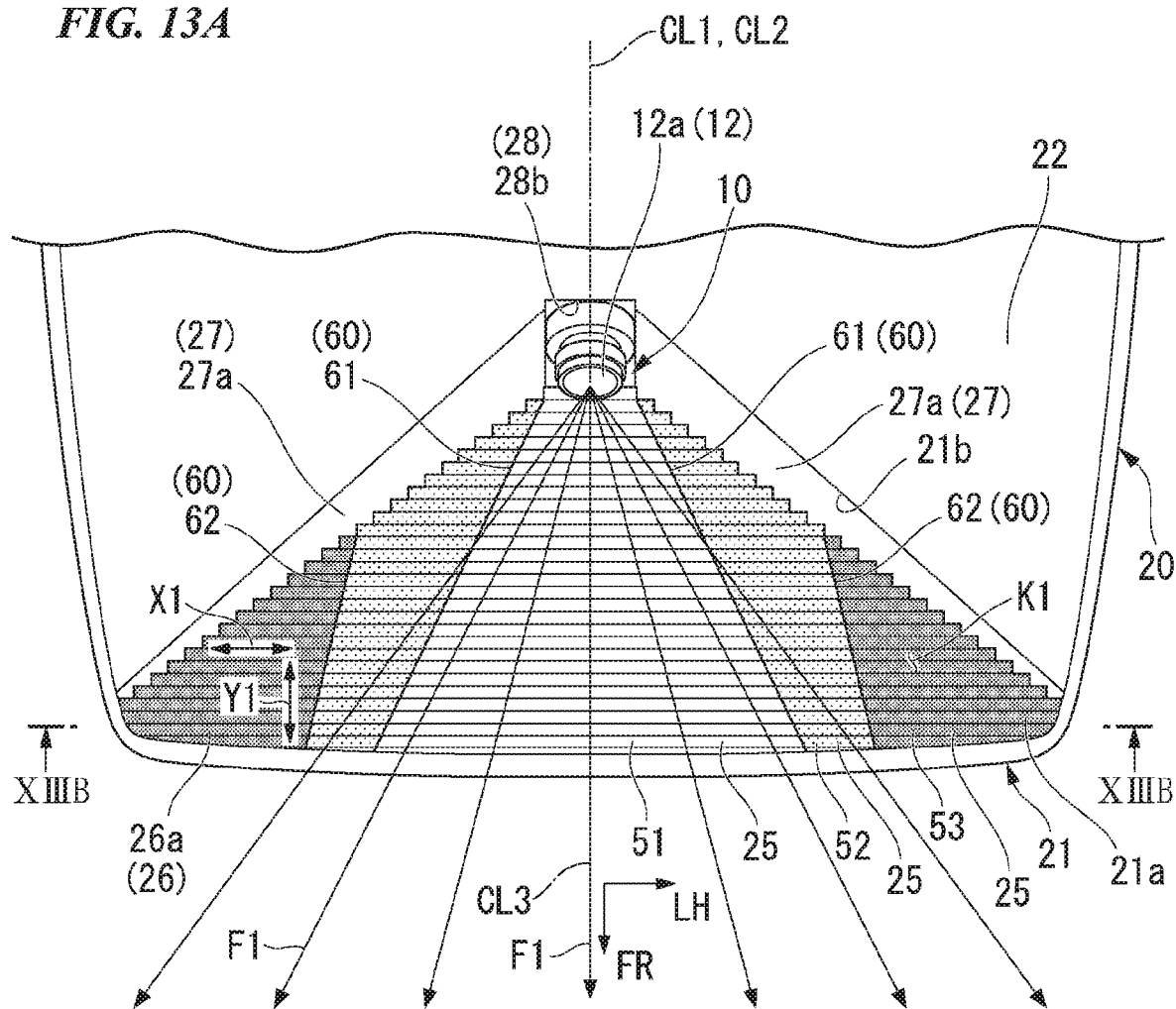
FIG. 13A is a plan view of the reflected wave reducing structure of the camera hood.
Figure 13B:
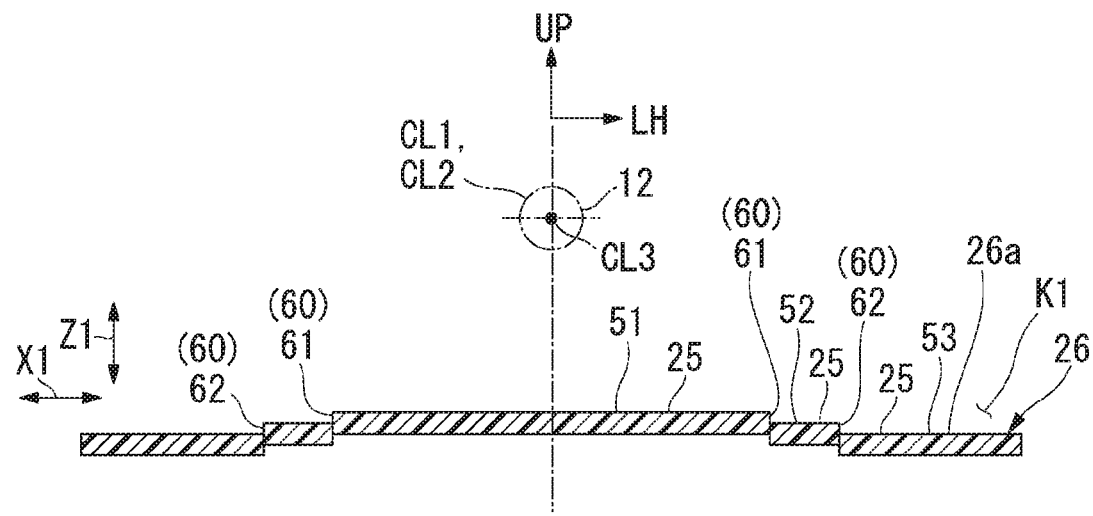
FIG. 13B is an enlarged view of the XIIIB portion of FIG. 13A and illustrates a second example of the partition part of the reflected wave reducing structure.

In the example of FIGS. 12A and 12B, although the design includes the vertical stepped surfaces 61 to 63 as the partition part 60 that extend in the vehicle front-rear direction in a plan view, the present invention is not limited to this configuration, and as illustrated in FIGS. 13A and 13B, for example, the design may include the vertical stepped surfaces 61 and 62 as the partition part 60 that extend to be inclined with respect to the vehicle front-rear direction to follow the detection direction that extends radially from the lens 12 in a plan view.

It can be said that the vertical stepped surfaces 61 and 62 in FIGS. 13A and 13B are also formed to extend parallel to the detection direction F1 of the lens 12.

In front of the lens 12, the front region 51 including the optical axis CL3 is positioned at the center in the surface width direction X1 in a plan view among the plurality of vertical regions 51 to 53 arranged in the vehicle left-right direction. The front region 51 is formed in a trapezoidal shape in which the left-right width extends toward the front in a plan view. The front region 51 is disposed at a highest position (a position close to the optical axis CL3 in the height direction Z1) on the radially extending bottom surface 26a of which the left-right width extends toward the front. The regions positioned on the sides outward to the left and right from the front region 51 (the second vertical region 52 and the third vertical region 53 in the example of FIGS. 13A and 13B) are disposed such that the positions are lowered stepwise toward the sides outward to the left and right. The surfaces of the vertical regions 51 to 53 are disposed parallel to each other.

The vertical stepped surfaces 61 and 62 extending parallel to side edges of the front region 51 in a plan view (or extending in the detection direction F1 that extends radially from the lens 12) are formed between vertical regions 51 to 53 adjacent in the surface width direction X1. The vertical stepped surfaces 61 and 62 face sides outward to the left and right.

That is, the vertical stepped surfaces 61 and 62 do not face the lens 12 side, and thus reflection of light or the like from the vertical stepped surfaces 61 and 62 to the lens 12 side is inhibited. The bottom surface 26a and the reflected wave reducing structure 25 that are wide in the vehicle left-right direction are partitioned into the plurality of vertical regions 51 to 53 in the vehicle left-right direction, and thereby an impression that the bottom surface 26a and the reflected wave reducing structure 25 are too wide is avoided. Since the vertical stepped surfaces 61 and 62 are inclined to spread radially in a plan view, the design can be easily adapted to the bottom surface 26a and the reflected wave reducing structure 25 which extend radially. Further, as in the example of FIGS. 12A and 12B, a length (width) of the vertical region in the surface width direction X1 may be formed to become smaller as the region becomes closer to the lens 12 and formed to become larger as the region becomes further away from the lens 12 (not illustrated). Also, a length (width) of the vertical region in the surface width direction X1 may be formed to become larger as the region becomes closer to the lens 12 and formed to become smaller as the region becomes further away from the lens 12 (not illustrated).

FIGS. 14A and 14B illustrate an example in which the bottom surface 26a and the reflected wave reducing structure 25 are partitioned into a plurality of horizontal regions 55 to 57 in the surface front-rear direction. In the example of FIGS. 14A and 14B, the bottom surface 26a includes horizontal stepped surfaces 65 and 66 as the partition part 60 extending in the surface width direction X1.

For example, on the bottom surface 26a, for example, a plurality of ranges including a predetermined number of wave shapes on the reflected wave reducing structure 25 are set as horizontal regions 55 to 57 extending in the surface width direction X1 and intersecting the detection direction (the optical axis CL3) in a plan view. The plurality of horizontal regions 55 to 57 (the first horizontal region 55 to the third horizontal region 57 in the example of FIGS. 14A and 14B) are arranged in the surface front-rear direction Y1. The first horizontal region 55 positioned furthest rearward (on the lens side) is disposed at a highest position on the bottom surface 26a. The regions positioned on a side in front of the first horizontal region 55 (in the example of FIGS. 14A and 14B, the second horizontal region 56 and the third horizontal region 57) are arranged such that the positions are lowered stepwise toward the front side. Surfaces of the horizontal regions 55 to 57 are disposed parallel to each other.

The horizontal stepped surfaces 65 and 66 extending in the surface width direction X1 in a plan view are formed between the horizontal regions 55 to 57 adjacent in the surface front-rear direction. Each of the horizontal stepped surface 65 and 66 faces the side in front. That is, the horizontal stepped surfaces 65 and 66 do not face the lens 12 side, and thus reflection of light or the like from the horizontal stepped surfaces 65 and 66 to the lens 12 side is inhibited. The horizontal stepped surfaces 65 and 66 and the horizontal regions 55 to 57 extend in a direction (the surface width direction X1) perpendicular to the optical axis CL3 of the camera 10 in a plan view, and thereby an effect of making the bottom surface 26a and the reflected wave reducing structure 25 appear slim in the surface front-rear direction Y1 is achieved. Further, a length of the horizontal region in the surface front-rear direction Y1 may be formed to become smaller as the region becomes closer to the lens 12 and formed to be larger as the region becomes further away from the lens 12 (not illustrated). Also, a length of the horizontal region in the surface front-rear direction Y1 may be formed to become larger as the region becomes closer to the lens 12 and formed to be smaller as the region becomes further away from the lens 12 (not illustrated).

Figure 15:
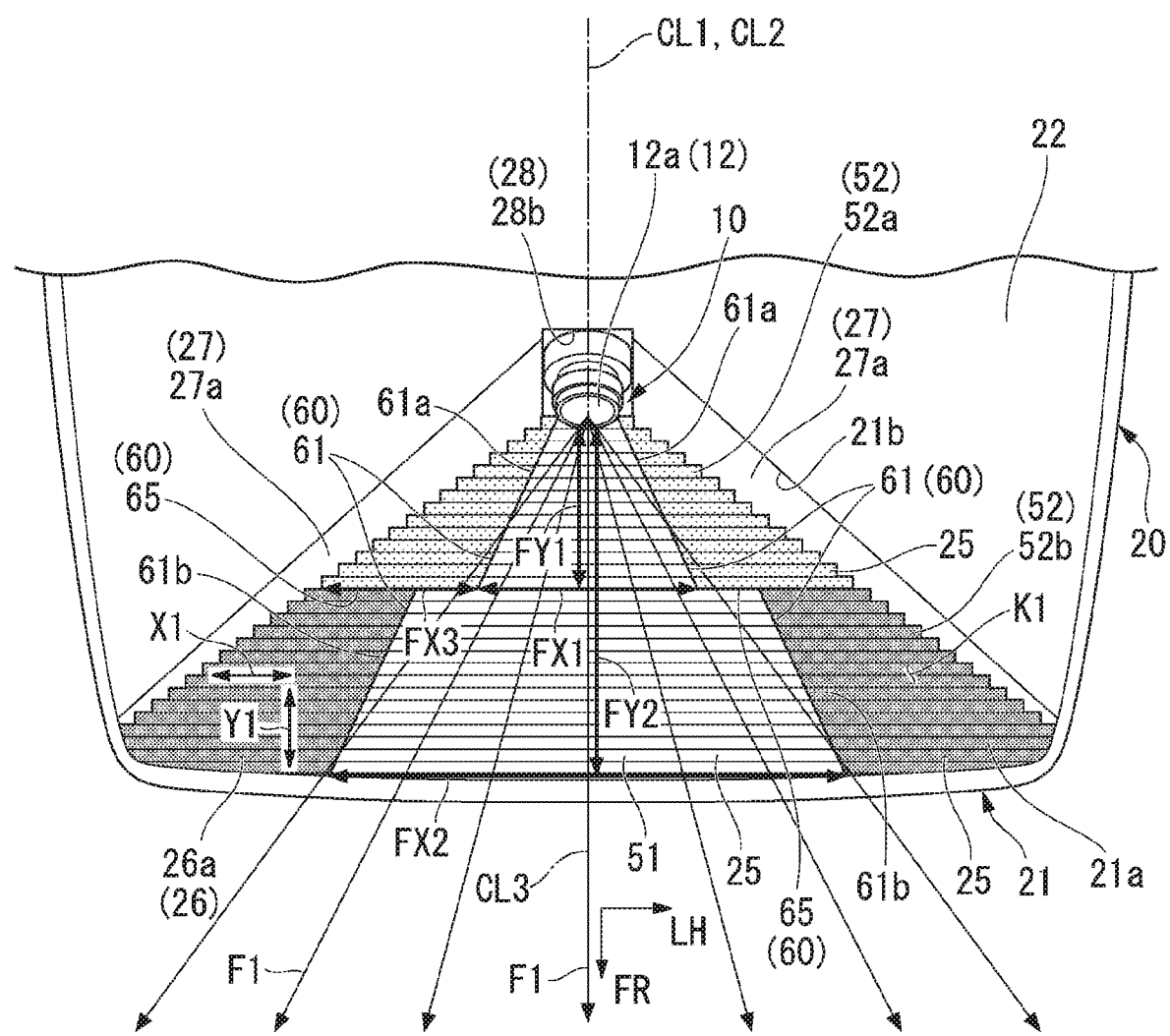
FIG. 15 is a plan view of the reflected wave reducing structure of the camera hood and illustrates a fourth example of the partition part of the reflected wave reducing structure.

FIG. 15 illustrates an example in which the bottom surface 26a and the reflected wave reducing structure 25 are partitioned into a plurality of regions in directions of the surface width direction X1 (the vehicle left-right direction in this embodiment) and the radial detection direction F1 (or the surface front-rear direction Y1) in a plan view. In the example of FIG. 15, the bottom surface 26a includes the vertical stepped surface 61 as the partition part 60 extending in the radial detection direction F1 (or the surface front-rear direction Y1) in a plan view and the horizontal stepped surface 65 as the partition part 60 extending in the surface width direction X1. The vertical stepped surface 61 is formed on both the left and right sides sandwiching the front region 51 of the camera 10. The horizontal stepped surface 65 is formed at an intermediate portion in the surface front-rear direction Y1. Further, the term "intermediate"

used in the present embodiment is meant to include not only a center between both ends of a subject but also an inner range between both ends of the subject.

The vertical stepped surface 61 is divided into a front and a back at a position in the front-rear direction at which the horizontal stepped surface 65 is positioned. The vertical stepped surface 61 is divided into a rear vertical stepped surface 61a positioned on the rear side (the lens 12 side) and a front vertical stepped surface 61b positioned on the front side. The front vertical stepped surface 61b is offset outward in the left-right direction with respect to the rear vertical stepped surface 61a with a left and right inner portion of the horizontal stepped surface 65 therebetween. A side edge of the front region 51 is formed in a crank shape in a plan view by the rear vertical stepped surface 61a, the left and right inner portion of the horizontal stepped surface 65, and the front vertical stepped surface 61b.

A position at which the vertical stepped surface 61 is divided may be determined on the basis of a ratio between lengths of two arrow portions FX1 and FX2 in the surface width direction X1 in FIG. 15. Also, the position may be determined on the basis of a ratio between lengths of two arrow portions FY1 and FY2 in the surface front-rear direction Y1. For example, when the position is determined using the lengths in the surface width direction X1 as a reference, a ratio of "the length FX1 on a side closer to the lens 12":"the length FX2 on a side farther from the lens 12" may be an integer ratio such as 1:2. Also, when the position is determined using the lengths in the surface front-rear direction Y1 as a reference, a ratio of "the length FY1 from the lens 12 to the horizontal stepped surface 65":"the length FY2 from the lens 12 to a distal end of the reflected wave reducing structure 25" may be an integer ratio such as 1:2. These ratios of the lengths in the surface width direction X1 and the surface front-rear direction Y1 are determined as appropriate. The positions of the stepped surfaces can also be set on the basis of lengths of other portions other than the lengths of the portions described above. Also, when the ratio of lengths is not used, a method such as setting the position to be the same length as to an arbitrary portion is also conceivable (such as a method in which lengths of the two arrow portions FX1 and FX3 disposed in the surface width direction in the vicinity of the center in FIG. 15 are set to be equal to each other).

Rear vertical regions 52a, which are rear portions of the second vertical regions 52 on a side outward from the front region 51, are adjacent to sides outward to the left and right from the rear vertical stepped surfaces 61a, and front vertical regions 52b, which are front portions of the second vertical regions 52, are adjacent to sides outward to the left and right from the front vertical stepped surfaces 61b. On the radially extending bottom surface 26a in a plan view, the front region 51 is disposed at a highest position (a position close to the optical axis CL3), the rear vertical regions 52a on outer sides of the rear portion of the front region 51 are disposed at positions lower by one level with respect to the front region 51, and the front vertical regions 52b on outer sides of the front portion of the front region 51 are disposed at positions lower by one more level.

The vertical stepped surfaces 61 face the sides outward to the left and right, and the horizontal stepped surface 65 faces the front. That is, neither the vertical stepped surfaces 61 nor the horizontal stepped surface 65 faces the lens 12 side, and thus reflection of light or the like from the vertical stepped surfaces 61 and the horizontal stepped surface 65 to the lens 12 side is inhibited. Further, at least a portion of the vertical regions 52 on the sides outward to the left and right from the front region 51 may be configured to be disposed at a position higher than that of the front region 51, and at least a portion of the vertical stepped surfaces 61 on the side outward from the front region 51 may be configured to face a side inward to the left or right, that is, the lens 12 side. In this case, the reflected wave reducing structure 25 is preferably provided also on the vertical stepped surfaces 61 facing the lens 12 side.

In each example described above, the partition part 60 between the plurality of regions is formed by the stepped surfaces, but the partition part 60 is not limited to the stepped surfaces, and the partition part 60 may be formed by, for example, one that does not have a three-dimensional shape (for example, a line, a pattern, or the like drawn on the bottom surface 26a). Further, the partition part 60 may be formed by a switching part with respect to colors, surface treatments, or the like of the reflected wave reducing structure 25. Also, the partition part 60 may be formed by switching of a shape such as embossing or waves of the reflected wave reducing structure 25. Also, when the segment body 40 is provided on the bottom surface forming part 26, the partition part 60 may be formed by a gap or a step in a mating part (segmented part) between the outer peripheral portion 40a of the segment body 40 and the inner peripheral portion 37a of the fixed-side opening part 37. The above-described three-dimensional shape and the switching part may be used in appropriate combination.

In the case of the reflected wave reducing structure 25 including a plurality of three-dimensional pattern shapes such as a wave shape, the three-dimensional shape such as the stepped surface provided in the partition part 60 has a large difference in height from each of the pattern shapes in the height direction Z1. Alternatively, a groove wider than a width of each pattern shape in a direction along the bottom surface 26a is provided. Thereby, even in a case of the reflected wave reducing structure 25 having a three-dimensional shape, a visual segmented design can be given. The difference in height and the width of the three-dimensional shape allowed in the partition part 60 are such that the bottom surface 26a appears to have substantially a flat shape and does not include a large step or bending such as the side wall 27a.

As described above, the vehicle 1 according to the above-described embodiment is the vehicle 1 including the external environment detection camera 10 and the camera bracket 20 which supports the external environment detection camera 10 on the vehicle body 1a, in which the camera bracket 20 includes the lens hood 21 that surrounds the detection space K1 extending in the detection direction F1 from the lens 12 side of the external environment detection camera 10, the lens hood 21 includes the bottom surface forming part 26 that forms a flat-shaped surface (the bottom surface 26a) facing the detection space K1, the bottom surface 26a extends to spread radially in the detection direction F1 from the lens 12 side and includes the reflected wave reducing structure 25 that reduces reflected light reaching the lens 12 on this bottom surface 26a, and the bottom surface forming part 26 includes a partition part 60 that partitions the reflected wave reducing structure 25 into a plurality of regions 51 to 57.

Also, the camera bracket 20 in the above-described embodiment is the camera bracket 20 that supports the external environment detection camera 10 on the vehicle body 1a, in which the camera bracket 20 includes the lens hood 21 that surrounds the detection space K1 extending in the detection direction F1 from the lens 12 side of the external environment detection camera 10, the lens hood 21 includes the bottom surface forming part 26 that forms a flat-shaped surface (the bottom surface 26*a*) facing the detection space K1, the bottom surface 26*a* extends to spread radially in the detection direction F1 from the lens 12 side and includes the reflected wave reducing structure 25 that reduces reflected light reaching the lens 12 on this bottom surface 26*a*, and the bottom surface forming part 26 includes a partition part 60 that partitions the reflected wave reducing structure 25 into a plurality of regions 51 to 57.

According to this configuration, the partition part 60 that partitions the reflected wave reducing structure 25 into the plurality of regions 51 to 57 is formed on the bottom surface forming part 26 that forms the flat-shaped bottom surface 26*a* having the reflected wave reducing structure 25 of the lens hood 21, and thereby the partition part 60 serves as a visual accent of the reflected wave reducing structure 25 and gives a change in appearance of the reflected wave reducing structure 25. That is, when the detection range of the external environment detection camera 10 is extended, although the reflected wave reducing structure 25 is also extended accordingly, simply extending the reflected wave reducing structure 25 affects the appearance, but when the partition part 60 is intentionally provided in the reflected wave reducing structure 25, design quality of the reflected wave reducing structure 25 can be improved, and the appearance around the reflected wave reducing structure 25 can be improved.

In the vehicle 1 of the above-described embodiment, the partition part 60 includes the stepped surfaces 61 to 63, 65, and 66 which are formed on the bottom surface 26*a* of the bottom surface forming part 26.

According to this configuration, the stepped surfaces can be formed at the same time when the bottom surface forming part 26 is formed, and thus a segmented design of the reflected wave reducing structure 25 can be easily provided. For example, although the bottom surface 26*a* of the lens hood 21 is inclined further away from the optical axis CL3 with distance away from the lens 12 in the detection direction F1, when the region separated in the detection direction F1 is changed to be separated from the optical axis CL3 by interposing the stepped surfaces in accordance with the inclination, the stepped surfaces do not face the lens 12 side, thus reflection of light or the like from the stepped surfaces to the lens 12 side can be inhibited.

In the vehicle 1 of the above-described embodiment, the reflected wave reducing structure 25 is irregularities formed on the bottom surface 26*a*, and the stepped surfaces 61 to 63, 65, and 66 of the partition part 60 form steps having a difference in height from the irregularities of the reflected wave reducing structure 25.

According to this configuration, even if the reflected wave reducing structure 25 has irregularities on the bottom surface 26*a*, since the stepped surfaces of the partition part 60 are formed to have steps having a difference in height from the irregularities of the reflected wave reducing structure 25, the partition part 60 can form a visual accent of the reflected wave reducing structure 25 and give a change in appearance of the reflected wave reducing structure 25.

In the vehicle 1 of the above-described embodiment, when a direction perpendicular to the detection direction F1 in a plan view on the bottom surface 26*a* is the surface width direction X1, a direction perpendicular to the surface width direction X1 in the plan view on the bottom surface 26*a* is the surface front-rear direction Y1, and a direction perpendicular to the surface width direction X1 and the surface front-rear direction Y1 is a height direction Z1, the partition part 60 partitions the reflected wave reducing structure 25 into the plurality of vertical regions 51 to 54 in the surface width direction X1, and, the front region 51 positioned in front of the lens 12 among the plurality of vertical regions 51 to 54 is disposed closer to the optical axis CL3 of the lens 12 in the height direction Z1 than the vertical regions 52 to 54 positioned outward from the front region 51 in the surface width direction X1 are.

According to this configuration, the reflected wave reducing structure 25 is partitioned into the plurality of vertical regions 51 to 54 in the surface width direction X1, and the front region 51 of the lens 12 is disposed to be higher (closer to the optical axis CL3) than the vertical regions 52 to 54 on the outer side in the surface width direction X1, and thereby the stepped surfaces 61 to 63 between the front region 51 and the outer vertical regions 52 to 54 do not face the lens 12 side, and reflection of light or the like from the stepped surfaces 61 to 63 to the lens 12 side can be inhibited.

In the vehicle 1 of the above-described embodiment, in the plurality of vertical regions 51 to 54, the vertical region is disposed further away from the optical axis CL3 in the height direction Z1 as the vertical region is positioned further outward in the surface width direction X1.

According to this configuration, the vertical region on an outer side in the surface width direction is disposed to be lower (away from the optical axis CL3) than the vertical region on an inner side in the surface width direction X1, and thereby the stepped surfaces 61 to 63 between vertical regions adjacent in the surface width direction X1 do not face the lens 12 side, and reflection of light or the like from the stepped surfaces 61 to 63 to the lens 12 side can be inhibited.

In the vehicle 1 of the above-described embodiment, the partition part 60 partitions the reflected wave reducing structure 25 into the plurality of horizontal regions 55 to 57, 52*a*, and 52*b* in the surface front-rear direction Y1, and the plurality of horizontal regions 55 to 57, 52*a*, and 52*b* are disposed further away from the optical axis CL3 in the height direction Z1 as the horizontal region is farther from the lens 12 in the detection direction F1 in the surface front-rear direction Y1.

According to this configuration, the horizontal region is disposed to be lower (away from the optical axis CL3) as the horizontal region is farther from the lens 12 in the detection direction F1, and thereby the stepped surfaces 65 and 66 between horizontal regions adjacent in the surface front-rear direction Y1 do not face the lens 12 side, and reflection of light or the like from the stepped surfaces 65 and 66 to the lens 12 side can be inhibited. Also, although the bottom surface 26*a* of the lens hood 21 is inclined further away from the optical axis CL3 with distance away from the lens 12 in the detection direction F1, the plurality of horizontal regions can be disposed with heights thereof naturally changing in accordance with the inclination.

In the vehicle 1 of the above-described embodiment, the partition part 60 includes at least one of a line and a pattern drawn on the bottom surface 26*a*, a switching part of treatments on the bottom surface 26*a*, and a segmented part when the surface forming part 26 has a segmented structure.

According to this configuration, a segmented design of the reflected wave reducing structure 25 can be easily provided by at least one of a line and a pattern drawn on the bottom surface of the bottom surface forming part, switching of a treatments such as colors, surface treatments, shapes on the bottom surface, and a segmented part when the surface forming part 26 has a segmented structure.

Further, the present invention is not limited to the above-described embodiment, and for example, the camera bracket 20 is not limited to a configuration in which it is fixed to the front window glass 3 and may be fixed to the vehicle main body at a location other than the front window glass 3 such as, for example, a roof or a front pillar. In this case, the camera bracket 20 may be configured to cause the lens hood 21 to extend in the detection direction F1 (front window glass 3 side) from a position of the camera bracket 20 fixed to the vehicle main body. The lens hood 21 may be configured to be disposed close to the front window glass 3 without being in contact therewith. The opening 21b of the lens hood 21 is not limited to a configuration in which it is in contact with the front window glass 3 to be completely sealed, and may be configured to be disposed and closed with a gap to some degree with respect to the front window glass 3. The lens hood 21 is not limited to one fixed to the front window glass 3 (transmission member). The vehicle 1 is not limited to the configuration in which the external environment detection camera 10 is supported by the camera bracket 20 and may be configured such that the camera bracket 20 is supported by the external environment detection camera 10. In this case, it can be said that the fixed body 30 is indirectly fixed to the vehicle main body 1a.

The external environment detection sensor is not limited to one that is installed in the window in front of the passenger compartment to detect the front of the vehicle, and may be a sensor that is installed on a window on a lateral side of the passenger compartment to detect the lateral side of the vehicle, or may be a sensor that is installed on a window behind the passenger compartment to detect the rear of the vehicle. The transmission member disposed in the detection direction of the external environment detection sensor is not limited to a window member such as a windshield provided as the window of the passenger compartment, and may be a transmission member disposed in a detection direction of a sensor installation location when, for example, the sensor is installed on an inner side of an exterior part or the like. The transmission member disposed in the detection direction of the external environment detection sensor is not limited to glass and may be mad of a resin or the like. In a case of transport equipment such as a motorcycle that does not have a passenger compartment, an installation location of the external environment detection sensor may be a transmission member such as a cowl screen instead of the window member.

For example, the camera may be a camera that captures not only visible light but also invisible light such as infrared rays. Not only an optical sensor such as a camera but also an infrared ray sensor or a radio wave sensor such as a radar using microwaves such as millimeter waves, or the like may be used. Regarding the disposition of the lens of the camera in the above-described embodiment, it becomes a disposition of an antenna in a case of radar. A configuration including a plurality of sensors such as a stereo camera may be used instead of a single sensor. A configuration using a camera and a radar in combination may also be used.

The vehicle 1 according to the embodiment is an example of the transport equipment, and a vehicle as the transport equipment to which the present invention is applied is not limited to a passenger car and also includes a cargo vehicle, and furthermore, the present invention is not limited to a vehicle having a passenger compartment and also includes a small saddle-type vehicle such as a motorcycle. The vehicle is a vehicle such as a two-wheeled vehicle, a three-wheeled vehicle, or a four-wheeled vehicle, and a driving source thereof is an internal combustion engine such as a gasoline engine or a diesel engine, an electric motor, or a combination thereof. The electric motor operates using electric power generated by a generator connected to an internal combustion engine, or discharge power of a secondary battery or a fuel cell. Also, the transport equipment includes bicycles, railways, ships, airplanes, and the like.

The configuration in the above-described embodiment is an example of the present invention, and various changes can be made without departing from the scope of the present invention such as replacing the components of the embodiment with well-known components.

What is claimed is:

1. A transport equipment comprising:
an external environment detection sensor which detects electromagnetic waves; and
a sensor bracket supported by a transport equipment main body, wherein
the sensor bracket includes a sensor hood which surrounds a detection space extending in a detection direction from a detection unit side of the external environment detection sensor,
the sensor hood includes a surface forming part which forms a flat-shaped surface facing the detection space,
the surface extends in the detection direction from the detection unit side and includes a reflected wave reducing structure that reduces reflected waves reaching the detection unit on the surface, and
the surface forming part includes a partition part that partitions the reflected wave reducing structure into a plurality of regions,
wherein the partition part includes stepped surfaces which are formed on the surface of the surface forming part.

2. The transport equipment according to claim 1, wherein
the reflected wave reducing structure is irregularities formed on the surface, and
the stepped surfaces of the partition part form steps having a difference in height from the irregularities of the reflected wave reducing structure.

3. The transport equipment according to claim 1, wherein
when a direction perpendicular to the detection direction in a plan view on the surface is a surface width direction, a direction perpendicular to the surface width direction in the plan view on the surface is a surface front-rear direction, and a direction perpendicular to the surface width direction and the surface front-rear direction is a height direction,
the partition part partitions the reflected wave reducing structure into a plurality of vertical regions in the surface width direction, and,
a front region including the front of the detection unit among the plurality of vertical regions is disposed closer to a detection central axis of the detection unit in the height direction than the vertical regions positioned outward from the front region in the surface width direction are.

4. The transport equipment according to claim 3, wherein, in the plurality of vertical regions, the vertical region is disposed further away from the detection central axis in the height direction as the vertical region is positioned further outward in the surface width direction.

5. The transport equipment according to claim 3, wherein
when a direction perpendicular to the detection direction in a plan view on the surface is a surface width direction, a direction perpendicular to the surface width direction in the plan view on the surface is a surface front-rear direction, and a direction perpendicular to the surface width direction and the surface front-rear direction is a height direction, the partition part partitions the reflected wave reducing structure into a plurality of horizontal regions in the surface front-rear direction, and the plurality of horizontal regions are disposed further away from the detection central axis in the height direction as the horizontal region is farther from the detection unit in the detection direction in the surface front-rear direction.

6. The transport equipment according to claim 1, wherein the partition part includes at least one of a line and a pattern drawn on the surface, a switching part of treatments on the surface, and a segmented part when the surface forming part has a segmented structure.

7. A sensor bracket supported by a transport equipment main body, the sensor bracket comprising:
 a sensor hood which surrounds a detection space extending in a detection direction from a detection unit side of the external environment detection sensor which detects electromagnetic waves, wherein
 the sensor hood includes a surface forming part which forms a flat-shaped surface facing the detection space,
 the surface extends to spread radially in the detection direction from the detection unit side and includes a reflected wave reducing structure that reduces reflected waves reaching the detection unit on the surface, and
 the surface forming part includes a partition part that partitions the reflected wave reducing structure into a plurality of regions,
 wherein the partition part includes stepped surfaces which are formed on the surface of the surface forming part.

\* \* \* \* \*